US009161299B2

(12) United States Patent
Huang et al.

(10) Patent No.: US 9,161,299 B2
(45) Date of Patent: Oct. 13, 2015

(54) REMOTE RADIO HEADER SELECTION

(71) Applicant: Transpacific IP Management Group Ltd., Taiwan (CN)

(72) Inventors: Ching-Yao Huang, Taiwan (CN); Chie-Ming Chou, Taiwan (CN)

(73) Assignee: Transpacific IP Management Group LTD., Taipei (TW)

( * ) Notice: Subject to any disclaimer, the term of this patent is extended or adjusted under 35 U.S.C. 154(b) by 59 days.

(21) Appl. No.: 13/926,602

(22) Filed: Jun. 25, 2013

(65) Prior Publication Data
US 2014/0212129 A1 Jul. 31, 2014

Related U.S. Application Data

(60) Provisional application No. 61/757,610, filed on Jan. 28, 2013.

(51) Int. Cl.
*H04B 17/00* (2015.01)
*H04W 48/20* (2009.01)
*H04B 10/25* (2013.01)
*H04W 48/12* (2009.01)
*H04W 88/08* (2009.01)

(52) U.S. Cl.
CPC ............... *H04W 48/20* (2013.01); *H04B 10/25* (2013.01); *H04W 48/12* (2013.01); *H04W 88/085* (2013.01)

(58) Field of Classification Search
CPC ............................. H04W 36/30; H04B 17/00
USPC .................................... 455/422.1, 423, 67.11
See application file for complete search history.

(56) References Cited

U.S. PATENT DOCUMENTS

| 8,548,330 | B2 * | 10/2013 | Berlin et al. ................... 398/115 |
| 8,682,392 | B2 * | 3/2014 | Gelbman et al. .............. 455/561 |
| 2011/0286509 | A1 * | 11/2011 | Cai et al. ........................ 375/224 |
| 2012/0134666 | A1 * | 5/2012 | Casterline et al. .............. 398/22 |
| 2012/0315048 | A1 * | 12/2012 | Beck et al. ....................... 398/98 |

* cited by examiner

*Primary Examiner* — Sonny Trinh
(74) *Attorney, Agent, or Firm* — Amin, Turocy & Watson, LLP

(57) ABSTRACT

Techniques for optimizing data transmission efficiency and accuracy in cellular network environments using remote radio headers are presented. In an aspect, a mobile device includes a collection component configured to collect fiber loss data from a plurality of remote radio devices in a cellular network. The fiber loss data can include data representative of data transmission loss over fibers respectively connecting the plurality of remote radio devices to a base station device. The mobile device further includes a selection component configured to select a remote radio device from the plurality of remote radio devices with which to access based in part on the fiber loss data.

24 Claims, 19 Drawing Sheets

REMOTE RADIO HEADER SELECTION

PRIORITY CLAIM

This application claims priority to U.S. Provisional Patent Application Ser. No. 61/757,610, filed on Jan. 28, 2013, entitled "METHOD AND APPARATUS FOR REMOTE RADIO HEADER SELECTION." The entirety of the aforementioned application is incorporated by reference herein.

TECHNICAL FIELD

This disclosure relates generally to optimizing data transmission efficiency and accuracy in cellular network environments using remote radio headers.

BACKGROUND

Remote radio headers (RRHs) are radio devices that can be employed in wireless network environments to extend network coverage. RRHs are connected to a baseband processing unit, such as a macro cell base station, via a fiber cable. RRHs employed within a macro cell provide a more consistent user experience in areas of the macro cell where the signal to noise ratio (SINR) from the macro cell base station is low. In this respect, each RRH can function as an alternative access point for a user device/equipment (UE). RRHs can include one or more antennas for performing radio communications with a UE. RRHs are sometimes referred to by other names such as remote radio units, remote radio devices, or remote antennas, and the term "RRH" as used herein should be understood as referring to any distributed radio device that functions as described herein.

In general a UE camps on (e.g., accesses or selects) an access point, such as an RRH, that the UE detects strong reference signal receiving power (RSRP) and/or received signal strength indicator (RSSI) after powering on. In order to find a desirable RRH to access, a UE may collect measurements of several candidate RRH's signal strength (e.g., measurements of RSRP and/or RSSI) to identify and select an RHH having desirable measurements. This procedure is called cell selection. When performing selection of cells serviced by RRHs, the UE primarily bases its decision on data loss associated with radio signal transmission as interpreted from RSSI/RSRP measurement data. However, the fiber backhaul connections between an RRH and the macro base station of a mobile network can influence the capacity and performance of the RRH and thus the data accuracy and efficiency of data communications between a UE and the mobile network. For example, problems associated with fiber backhaul connections between a macro base station and an RRH providing services to a UE can significantly impact overall data transmission efficiency and quality. Accordingly RRH selection based solely on radio signal strength data can result in unexpected drop in data rate.

DETAILED DESCRIPTION

Figure 1:
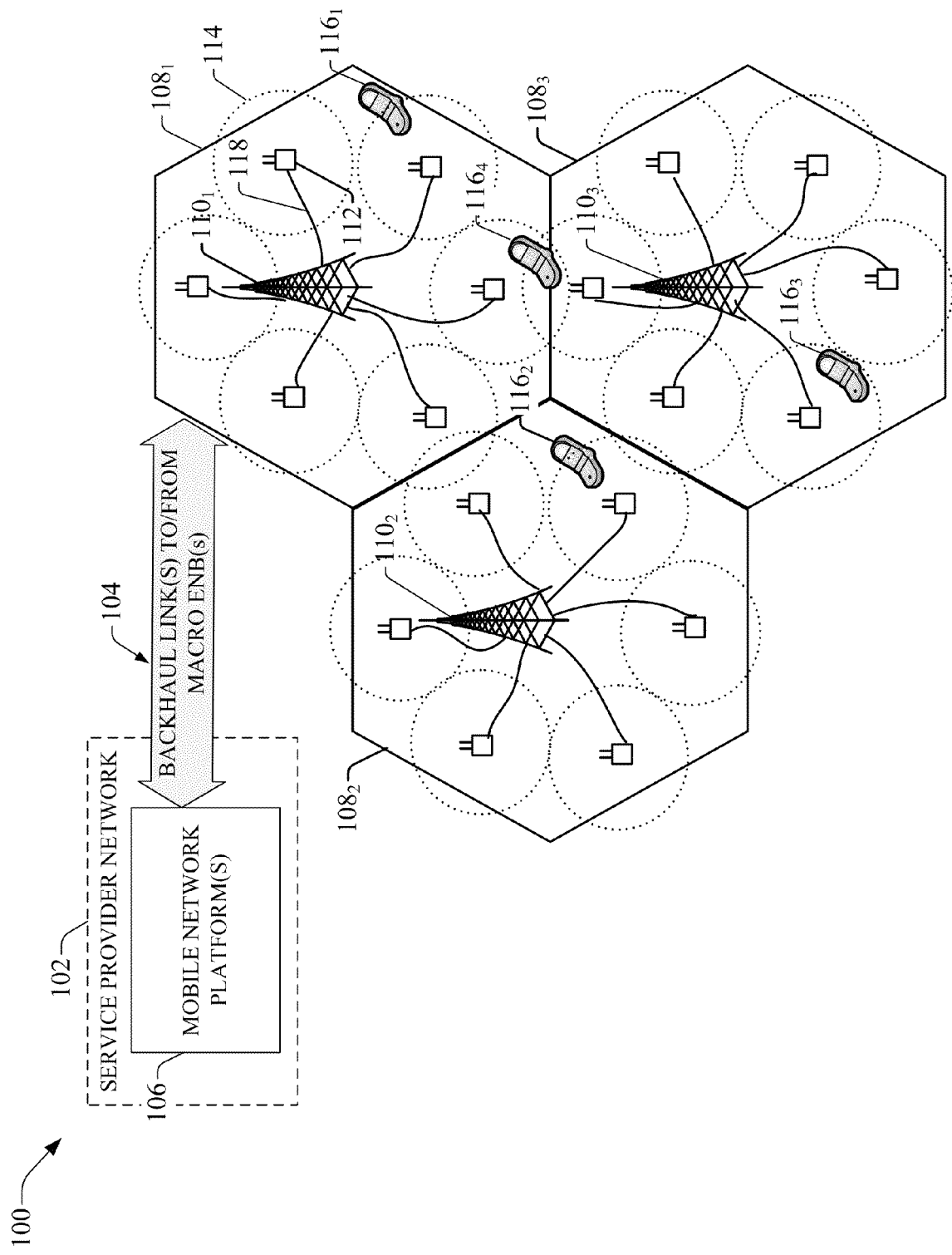
FIG. 1 illustrates a schematic wireless network environment that can operate, in accordance with various aspects and embodiments described herein.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As mentioned, wireless systems employ RRHs connected to macro base stations through fiber backhaul links to extend coverage and improve transmission data rate. Coordinated multiple point transmission (CoMP) technology is also increasingly employed in advanced wireless systems (e.g., advanced long term evolution (LTE-A) systems) to increase network performance. CoMP technology involves signal transmission and receipt coordination between multiple access points to enhance signal strength and reduce interference at cell boundaries. In general signal quality at cell boundaries is poor due to a large distance between the user device (UE) and the serving base station. This distance can result in lower transmission power from serving cell and increase interference from other cells.

For example, when a UE is in a cell edge region and CoMP is employed, it may be able to receive signals from multiple base stations. In view of the above effect, CoMP is a wireless communication technique that aims to facilitate coordination of signals transmitted from multiple base stations to UEs. For the downlink (DL), transmission from multiple base stations can be coordinated to significantly increase network performance.

CoMP techniques can be classified into two categories in terms of the signal processing type: joint processing (JP) and coordinated scheduling/beamforming (CS/CB). JP means that the data is available at each point in CoMP cooperating set. As used herein, a CoMP cooperating set includes a group of nodes involved in a CoMP scheme. CS/CB means that data is only available at the serving point (i.e. data transmission from that point) but user scheduling/beamforming decisions are made with coordination among points corresponding to the CoMP cooperating set. In particular, JP can be further classified into joint transmission (JT) and dynamic cell selection (DCS). JT is defined as the data transmission from multiple points, which can be part of a CoMP cooperating set or involve the entire CoMP cooperating set. DCS is defined as the data transmission from a selected one point of a CoMP cooperating set and the selected point could be changed at a time.

There are several transmission modes and scenarios being specified in advanced wireless networks that use RRHs connected to macro base stations through fiber backhauls to support CoMP technology. Certain aspects of CoMP require gathering information related to channels state/quality between UEs and respective access points or base stations. Decisions regarding initiation of CoMP and a CoMP category to employ (e.g., using JP and/or CS/CB) are then made based in part on this information.

It is investigated that the fiber backhaul connections of RRHs may introduce data transmission loss and this is not detected by conventional radio measurement that is used to facilitate RRH selection and CoMP implementation. This fiber based data transmission loss may force UEs to select inaccurate RRHs and initiate CoMP at wrong times. As a result, additional signaling overhead and performance degradation may be raised.

The disclosed subject matter provides mechanisms that optimize RRH selection by a UE while taking this fiber loss into account. In an aspect, a signaling exchange procedure between an RRH and UE taking fiber loss into account during cell selection and measurement is disclosed. In addition, mechanisms to calculate fiber loss are also provided. Accordingly, with the proposed methods, CoMP can be implemented more accurately without introducing additional overhead. In summary, when using fiber based calibration for RRH selection and CoMP decisions, as disclosed herein, the UE can be provided an expected data rate and the network can reduce efforts and overhead related to serve that UE.

In one embodiment, a mobile device/UE is provided that includes a collection component configured to collect fiber loss data from a plurality of remote radio devices (e.g. RRHs) in a cellular network. The fiber loss data can include data representative of a value of data transmission loss over fibers respectively connecting the plurality of remote radio devices to a base station device. The mobile device further includes a selection component configured to select a remote radio device from the plurality of remote radio devices with which to access based in part on the fiber loss data. In an aspect, the selection component is further configured to determine amounts of data transmission loss associated with respective ones of the plurality of remote radio devices based on the fiber loss data and select the remote radio device based in part on the remote radio device having a least amount of data transmission loss.

In another embodiment a method a remote radio device (RRH) includes a radio unit configured to wirelessly communicate with another device using radio frequency signals, a baseband unit configured to communicate with a base station device using a cable connecting the device to the base station device, and a memory having computer executable components stored thereon. The RRH further includes a processor communicatively coupled to the memory, the processor configured to facilitate execution of the computer executable components, the computer executable components including a calibration component configured to determine data transmission loss associated with transmission of data over the cable and a transmitting component configured to broadcast information representative of the data transmission loss using the radio unit.

In another embodiment, a method is provided that includes employing at least one processor executing computer executable instructions embodied on at least one non-transitory computer readable medium to perform the following operations: determining, by a remote radio device, data transmission loss associated with transmission of data over a cable connecting the remote radio device to a base station device, receiving, by the remote radio device, a request from a mobile device to access the remote radio device, determining a power level of a radio frequency signal received by the remote radio device in association with the request, determining a performance level based on the data transmission loss and the power level, and enabling the mobile device to access the remote radio device in response to the performance level being above a threshold value.

In another embodiment, a mobile device includes a selection component configured to select a remote radio device from a plurality of remote radio devices of a cellular network to employ for data transmission and a communication component configured to conduct the data transmission with the remote radio device using radio frequency transmissions. The mobile device further includes a performance evaluation component configured to determine a data transmission performance level based on the radio frequency transmissions, compare the data transmission performance level to a reference value, and infer a degree of data loss associated with data transmission between the remote radio device and a base station device over a cable employed by the remote radio device to complete the data transmission based on a difference between the data transmission performance level and the reference value.

In yet another embodiment, provided is a tangible computer readable medium comprising computer executable instructions that, in response to execution, cause a system comprising a processor to perform operations. The operations can include receiving, by a remote radio device serving a mobile device, information indicating a drop in data transmission rate associated with data transmission between the remote radio device and the mobile device. The operations further include determining a data transmission loss associated with data transmission between the remote radio device and a base station device over a cable connecting the remote radio device and the base station device based on the information.

With reference to the drawings, FIG. 1 is an exemplary wireless network 100 that can operate in accordance with aspects described herein. Wireless network 100 can employ various cellular technologies. In an aspect, wireless network 100 is a long-term evolution (LTE) system. LTE may be said to correspond to Third Generation Partnership Project (3GPP) Release 8 (Rel-8 or R8), Release 9 (Rel-9 or R9), Release 10 (Rel-10 or R10), and possibly beyond R10, while LTE Advanced (LTE-A) may be said to correspond to R10, R11 and possibly also to releases beyond Release 11. LTE-A systems improve spectrum efficiency by utilizing a diverse set of base stations deployed in a heterogeneous network topology. By using a mixture of macro, pico, femto and relay base stations, heterogeneous networks enable flexible and low-cost deployments and provide a uniform broadband user experience.

Wireless network 100 includes a number base stations and other network entities. The term base station as used herein can include various types of base stations including macro base stations and evolved node Bs (eNBs). An base station may be a station that communicates with user devices or user equipments (UE)s (e.g., UEs $116_\mu$ ($\mu$=1, 2, 3)) and may also be referred to as a base station, a node B, an access point, a remote radio header (RRH), or a similar component rather than a traditional base station. UEs $116_\mu$ can include any suitable communications device having telecommunication capabilities. For example, a UE 116 can include but is not limited to, a mobile device such as mobile telephone, personal digital assistant, a handheld or laptop computer, and similar devices. In general, the terms UE and mobile device are used interchangeably herein.

Each base station of system 100 may provide communication coverage for a particular geographic area. As used herein, the term "cell" refer to the particular geographic coverage area of abase station and/or abase station subsystem serving the coverage area, depending on the context in which the term is used. Abase station may provide communication coverage for a macro cell, a pico cell, a femto cell, a RRH cell and/or other types of cells. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. The pico may be connected to the macro via a backhaul. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like).

A base station for a macro cell may be referred to as a macro base station. A base station for a pico cell may be referred to as a pico base station. Similarly, a base station for a femto cell may be referred to as a femto base station or a home base station, and, a base station for a RRH cell may be referred to as a remote radio header base station, or simply as a RRH. An base station may support one or multiple (e.g., two, three, four, and the like) cells.

Illustrative wireless network 100 includes a set of three macro cells $108_1$-$108_3$ serviced by respective base stations $110_1$-$110_3$ It should be appreciated that coverage macro cells $108_\mu$ ($\mu$=1, 2, 3) are illustrated as hexagons; however, coverage cells can adopt other geometries generally dictated by a deployment configuration or floor plan, geographic areas to be covered, and so on.

Each macro cell 108, respectively includes a plurality of RRHs 112 whose coverage areas constitutes respective RRH cells 114 within the respective macro cells $108_1$-$108_3$. Although respective macro cells $108_1$-$108_3$ are depicted with six RRHs 112 symmetrically dispersed therein, it should be appreciated that a macro cell 108, can include any number N of RRHs 112 dispersed at various locations within the cell. The RRHs 112 are respectively connected to their macro base stations $110_1$-$110_3$ with a high speed wired connection, such as a high capacity low latency fiber 118. This wired connection enables fast communications and coordination between the macro base station 110 and the RRHs 112 and allows for reliable configurations of the transmissions. Each RRH 112 is configured to communicate with its macro base station using this fiber 118 backhaul connection for baseband processing of communications between the RRH 112 and a UE 116.

In deployment of one or more RRHs in a wireless network with one or more macro base stations, (e.g., wireless network 100), there are various operation scenarios. In an embodiment, as seen in FIG. 1, the RRH cells 114 are included within macro cell $108_\mu$ coverage. According to this embodiment, the RRHs 112 include low transmission power RRHs having omni directional antennas. In one aspect, each RRH cell 114 is treated as an independent cell and thus has its own cell identifier (ID). From a UE's 116 perspective, each RRH is equivalent to a base station in this scenario. The normal hand off (HO) procedure is required when a UE moves from one RRH to another RRI. In a second aspect, the RRHs 112 are treated as part of the cell 108 of macro base station 110. That is, the macro base station 110 and the RRHs 112 have the same cell ID. One of the benefits of the second aspect is that the handover (HO) between the RRHs 112 and the macro base station 110 within the cell is transparent to a UE 110. Another potential benefit is that better coordination may be achieved to avoid interference among the RRHs 112 and the macro base station 110.

In another embodiment, a single macro base station 110 is employed in a homogeneous network connected via respective cables to several high transmission power RRHs. Also according to this embodiment, (although not depicted in this manner in FIG. 1), the RRH cell sites 114 can be located partially or entirely outside of a macro cell cite 108. According to this embodiment, the RRHs 112 can be located at greater distances from the macro base station and service RRH cell 114 sites with having a relatively large radius than low power RRHs.

In the each of the above described RRH deployment embodiment and related aspects, the RRHs 112 are connected to a macro base station 110 via a fiber cable 118. In an aspect, the fiber cable 118 is an optical radio over fiber (RoF) cable that operates using common public radio interface protocols. The RoF cable 118 can be categorized into two modes, single mode fibers and multimode fibers. In an aspect, fiber 118 is a single mode fiber. In another aspect, fiber 118 is a multimode fiber. Single mode fibers have a small glass core, typically around 9µ. Single mode fibers are used for high speed data transmission over long distances. They are less susceptible to attenuation than multimode fibers. Multimode fibers have large cores, usually either 50µ or 62.5µ. Multimode fibers are able to carry more data than single mode fibers though they are best for shorter distances because of their higher attenuation levels.

Various factors associated with both single mode and multimode fibers can influence attenuation and cause data loss including but not limited to: fiber loss, connector loss, and splice loss, system gain, wavelength, transmitter power, receiver sensitivity, dynamic range, fiber distance, hardware, and RRH design. Typically data loss associated with transmission over optical fibers 118 based on one or more of the above factors can range from about 2.3 decibels (dB) to about 4.3 dB. In an aspect, the RRHs 112 are configured to determine data loss associated with data transmission over a fiber 118 connecting it to a macro base station based in part on one or more of the above noted factors as well as current network conditions (e.g., on a routine basis or in response to t a request). This data loss can in turn be employed by the RRHs 112, a UE 116, the macro base station and/or the mobile network platform 106/service provider network 102 for various functions including but not limited to: cell selection, CoMP operations and HO operations.

Macro cells $108_\mu$ and associated components (e.g., macro base stations 110 and RRHs 112) are operated at least in part via mobile network platform(s) 106, which can be part of a service provider network 102, to provide wireless service. Mobile network platform(s) 106 facilitates circuit switched (CS)-based (e.g., voice and data) and packet-switched (PS) (e.g., internet protocol (IP), frame relay, or asynchronous transfer mode (ATM) . . . ) traffic and signaling generation, and delivery and reception for networked telecommunication in accordance with various radio technologies for disparate markets. Moreover, wireless network platform(s) 106 can control and manage base stations, for example, via a wireless network management component (e.g., radio network controller(s), cellular gateway node(s) . . . ) associated with one or more components of wireless network environment 100.

In wireless environment 100, mobile network platform(s) 106 can functionally connect with macro cell sites $108_\mu$ through backhaul link(s) 104 to/from the macro base stations $110_n$. In an aspect, backhaul link(s) 104 can include wired link components like T1/E1 or T3/E3 phone lines; a digital subscriber line (DSL) either synchronous or asynchronous; an asymmetric DSL (ADSL); an optical fiber backbone; a coaxial cable, etc.; and wireless link components such as line-of-sight (LOS) or non-LOS links which can include terrestrial air-interfaces or deep space links (e.g., satellite communication links for navigation). Each macro cell 108, facilitates wireless communication between base stations (e.g., macro base stations 110 and RRHs 112) and UEs 116, (and other types of devices (e.g. fixed devices) configured to transmit and receive radio communications) located therein.

In some aspects, in order to facilitate CoMP in a wireless environment in which RRHs are employed, such as system 100, coordination control functions can be provided in the mobile network platforms 106, the macro base station 110, the RRHs 112 and/or the UE 116. In one implementation, each RRH 112 may have built in, full medium access control (MAC) and physical layer functions (PHY). The MAC and the PHY functions of all the RRHs 112 as well as the macro base stations 110 may be controlled by a control element(s) (not shown). The main function of the control element(s) is to facilitate coordination between the macro base stations 110 and the RRHs 112 for downlink (DL) scheduling techniques associated with CoMP. In some aspects control elements and/or functions of a control element can be built into respective macro base stations. In another aspect, control components and/or one or more functions of a control component can be built into the RRHs 112. Still in other aspects, control components and/or one or more functions of a control component can be provided within the mobile network platforms 106.

Figure 2:
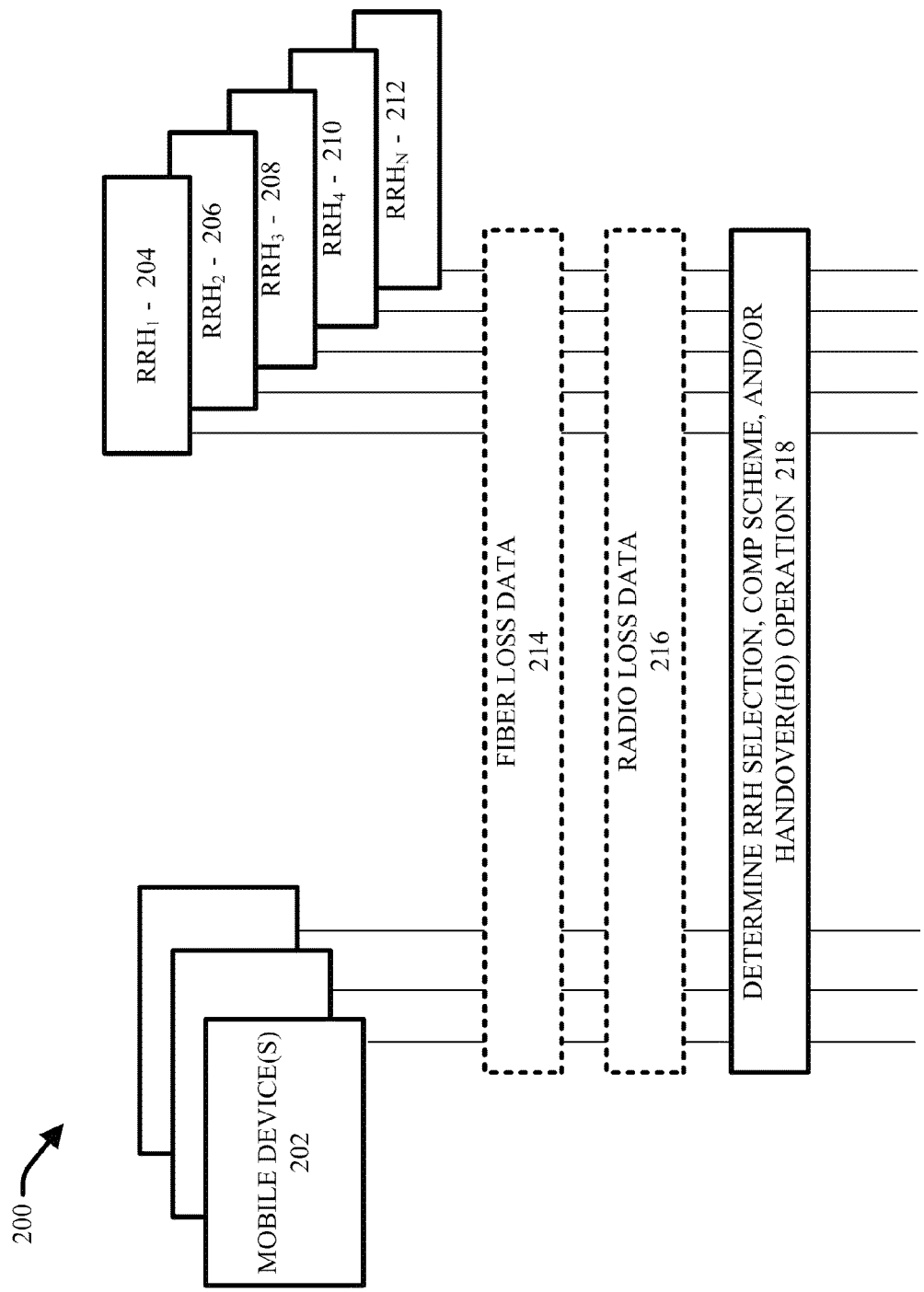
FIG. 2 presents a diagram of a framework 200 for selecting a remote radio header (RRH) and initiating/directing coordinated multiple point transmission (CoMP) based in part in fiber loss data associated with the RRH in accordance with various aspects and embodiments described herein.

Referring now to FIG. 2, presented is diagram of a framework 200 for selecting a remote radio header (RRH) and initiating/directing CoMP based in part on fiber loss data associated with RRH. Aspects of apparatuses, systems or processes explained herein can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

Framework 200 involves a wireless system (e.g., wireless system 100 and the like) having one or more CoMP enabled mobile devices 202 (UEs) and a plurality of remote radio devices or headers (RRHs) 204-212. It should be appreciated that each of the RRHs 202-212 are connected to a macro base station using a fiber cable as depicted in FIG. 1. In some aspects, each of the RRHs 204-212 are connected to the same macro base station. In other instances, one or more of the RRHs 204-212 can be connected to a different macro base station (e.g., the RRHs can be associated with different macro cells). It should also be appreciated that framework 200 can accommodate any number N of mobile devices and remote radio headers.

When a mobile device 202 is performing selection of an RRH from a plurality of RRHs 204-212, the mobile device 202 can collect data representative of strengths of radio frequency signals received (e.g., RF signal strength data) by the mobile device 202 when transmitted by the respective RRHs 204-212. The mobile device can then estimate RF signal strength associated with the respective RRHs 204-212 based on the RF signal strength data. For example, RRHs 204-212 can transmit reference signals or pilot signals to mobile device 202. The mobile device 202 can further measure RSSI/RSRP associated with the received signals. The mobile device 202 can further transmit calculated RF signal strength information to one or more RRHs 204-212. Similarly, an RRH can determine RF signal strength transmitted thereto by a UE (e.g., pilot signals or signals associated with random access RA). RF signal strength information can be employed by a mobile device 202 or an RRH to determine an amount of data loss associated with RF transmissions between the mobile device and the RRH, herein referred to as radio loss data 216. In an aspect, this radio loss data 216 can be used by mobile device 202 in association with selection of an RRH to access or camp on, a process referred to herein as cell selection.

Radio loss data 216 can also be used to determine a CoMP and/or determine HO operations. For example, radio loss associated with one or more RRHs 202-212 and UEs can influence initiation and timing of CoMP operations (e.g., using JP and/or CS/CB) as well as selection of which RRHs to employ in a CoMP cooperating set. In another example, when radio loss of a neighboring RRH is less than that of a serving RRH, data transmission between the mobile device and the serving RRH can be transferred to the neighboring RRH, a process referred to herein as HO.

However, as noted above cell selection, CoMP and/or HO operations between RRHs and UEs can also be influenced by fiber loss data 214 representative of data transmission loss over fibers connecting the respective RRHs 204-212 to one or more macro base stations. Therefore the radio loss data 216 alone does not reflect a real data rate. For example, the radio loss data 216 could reflect good radio performance but fail to indicate a serious fiber loss associated with a particular RRH. Under this scenario, if the mobile device/UE 202 selects a poor RRH from the plurality of RRHs 202-212 (due to its fiber loss) the UE can experience an unexpectedly low data rate and handover (HO) may be raised to handover the data session to another base station (e.g., another RRH). Moreover, where a data measurement set used for initiation and/or scheduling of CoMP depends on the radio loss data 216 only, an inaccurate data rate is represented because fiber loss can also influence the data rate. This inaccurate data rate can cause a UE or base station to initiate CoMP at wrong times and/or cause errors in CoMP. This inaccurate data rate may further complicate hybrid automatic repeat requests (HARQ) and transmission for different nodes.

The disclosed subject matters introduces methods and apparatuses for determining fiber loss data 214 associated with RRHs in a wireless network (e.g., network 100), calibrating RRH performance based at least in part on the fiber loss and employing the calibrated performance data in association with at least one of RRH selection, CoMP and HO operations. In particular, with reference to framework 200, a mobile device 202 can consider fiber loss data 214 representative of data transmission loss over fibers connecting respective RRHs 202-214 and/or radio loss data 216 associated with the respective RRHs 202-214 when making a determination of RRH selection 218. The mobile device 202 and/or the RRHs can further employ fiber loss data 214 and/or radio loss data 216 when making decisions regarding CoMP and HO 218. It should be appreciated that the fiber loss data 214 and radio loss data 216 can be reported by a collecting entity (e.g., the RRH or UE) to a network control element to facilitate and carry out CoMP and HO decisions. As noted above, the control element can be associated with a mobile network, a macro base station to which the RRH is connected, and/or a UE.

Figure 3:
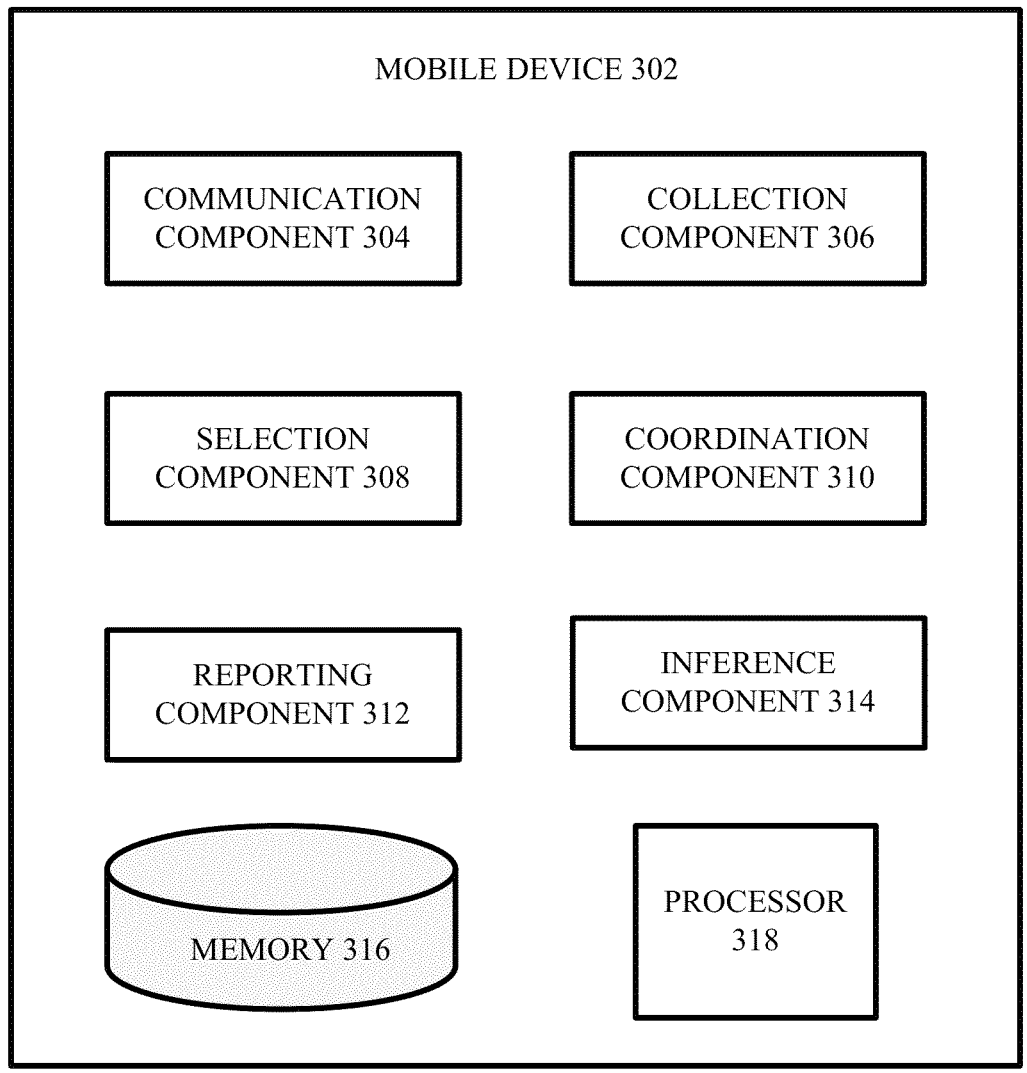
FIG. 3 presents an example mobile device capable of operating in accordance with framework 200 according to a first embodiment and various aspects described herein.

Turning now to FIG. 3, presented is an example mobile device/UE 302 capable of operating in accordance with framework 200 according to a first embodiment. Mobile device 302 can include one or more of the structure and functionality of mobile device 202 and vice versa. In the first embodiment, a plurality of RRHs deployed in a cellular network (e.g., RRHs 112 of network 100), connected to one or more macro base stations via cables, broadcast fiber loss data representative of data loss over the respective cables. This fiber loss data is received by mobile devices deployed in the network, such as mobile device 302. The mobile devices, (e.g., mobile device 302), can in turn employ the fiber loss data when selecting one of the RHHs to access (e.g., when performing cell selection) and/or when choosing to access an alternative base station.

The mobile devices (e.g., mobile device 302) can also employ the fiber loss data to facilitate and/or direct CoMP protocols and/or HO operations. With CoMP, a UE measures received signal strength of neighboring RRHs and reports the results to its serving RRH. The serving RRH will make decisions regarding CoMP (which neighboring RRHs will be involved to make CoMP transmission to the UE). The serving RRH will communicate the decisions to the selected RRHs and the UE to facilitate CoMP transmission. With HO, the serving cell will also receive measurement data from the UE regarding received signal strength of neighboring RRHs. The serving RRH however will employ the information to select a new RRH to serve the UE and then release connection with UE.

In an aspect, fiber loss data can further influence CoMP and HO decisions by a serving RRH. For example, mobile device 302 may initiate CoMP signaling in response to identification of poor operating performance. In association with initiation of CoMP, the network will request measurement information from the mobile device to facilitate selection of a CoMP cooperating set and CoMP category. The mobile device will report this measurement information to the network and the network will make the selection of the CoMP cooperating set and CoMP category based on the measurement information. In an aspect, this measurement information can include fiber loss data associated with a serving RRH and/or one or more neighboring RRHs. This measurement information can also include radio loss data associated with the serving RRH and one or more neighboring RRHs In another example, for HO, when a mobile device determines that the serving RRH become weak and a new serving cell is required, the mobile device reports measurement information to the serving cell and then serving RRH can make decisions regarding HO. In an aspect, this measurement information includes fiber loss data associated with the serving RRH and/or one or more neighboring RRHs. This measurement information can also include radio loss data associated with the serving RRH and one or more neighboring RRHs.

In an example, referring back to FIG. 2, where mobile device 302 resembles mobile device 202, the plurality of RRHs 204-212 can identify their respective fiber loss (e.g. in decibels (dB)) and broadcast fiber loss values in association with other broadcasted system information. For example, an RRH can broadcast its system information in a dedicated channel and any receiving node, such as mobile device 202, can acquire the system information for interpretation thereof. The system information, can include several operating parameters (e.g. identification information, bandwidth, etc.) in addition to fiber loss data. For example, the plurality of RRHs 204-212 can transmit system information blocks (e.g., SIBx) that include information representative of their respective fiber loss to mobile device 202.

In an aspect, the RRHs 204-212 can recalculate their fiber loss values and broadcast updated values on a scheduled basis. For example, the RRHs can calculate and broadcast fiber loss values on a periodic basis that accounts for changes in network conditions (e.g., about every 40.0 milliseconds in LTE-A system). In addition, an RRH 204-212 can determine its fiber loss value based in part on loading. For example, if loading on RRH 204 is high and its fiber is out of usage, RRH 204 could adopt a high fiber loss value to restrict incoming mobile devices (UEs). This behavior can inform incoming mobile devices, such as mobile device 202, that they may suffer a big packet loss if it selecting RRH 202. As a result, the mobile devices can be persuaded to select another RRH from the plurality of RRHs 204-212.

Upon receipt of broadcasted fiber loss values (e.g., fiber loss data 214) from one or more of the plurality of RRHs 204-212, mobile device 202 can relatively or absolutely analyze the fiber loss data 214 and radio loss data 216, jointly and/or separately, to determine which of the plurality of RRHs 204-212 to select for pairing, if any. Except upon network entry, the fiber loss data 214 shall be also considered by the mobile device 202 in CoMP and HO scenarios as discussed above.

Referring back to FIG. 3, mobile device 302 can include communication component 304, collection component 306, selection component 308, coordination component 310, reporting component 312 and inference component 314. Mobile device 302 can also include memory 316 for storing computer executable components and instructions. Mobile device 302 can further include a processor 318 to facilitate operation of the instructions (e.g., computer executable components and instructions) by the mobile device 302.

Collection component 304 is configured to collect data from one or more base stations in a wireless network in which the mobile device 302 is employed. The collection component 304 can also collect data related to network conditions. In an aspect, collection component 304 is configured to collect fiber loss data from a plurality of surrounding RRHs. The collection component 304 can further collect radio loss data from the plurality of surrounding RRHs. For example, the collection component 304 can collect radio frequency RF signal strength data from the plurality of RRHs, wherein the RF signal strength data includes data representative of strengths of radio frequency signals transmitted by the remote radio headers, respectively, from to the mobile device 302 (e.g., RSSI data). In an aspect, the collection component 304 can collect cell IDs for the respective RRHs from which the RF signal strength data is collected. In an aspect, the cell IDs for each RRH is different. In another aspect, the cell IDs for a set of RRHs matches a cell ID for a macro base station.

Selection component 306 is configured to facilitate cell selection based on the collected data. In particular, the selection component 306 is configured to select at least one RRH from the plurality of surrounding RRHs for access based on the fiber loss data and/or the radio loss data collected for the respective RRH. The selection component 306 can employ various selection criteria to facilitate identifying an RRH to access based on the collected data. In aspect, the selection component 306 employs one or more algorithms and/or look up tables stored in memory 316 to facilitate cell selection based in part on fiber loss data and/or radio loss data.

In one aspect, the selection component 306 is configured to determine amounts of data transmission loss associated with each of the candidate RRHs based on the fiber loss data collected from each of the candidate RRHs and select an RRH from the candidate RRHs having the least amount of data transmission loss. According to this aspect, the selection component 306 can perform cell selection based on fiber loss data alone.

In another aspect, the selection component 306 can determine an overall amount of data loss associated with each candidate RRH based on fiber loss data and radio loss data for each respective candidate RRH and select the RRH having a least amount of total loss. For example, the selection component 306 can determine a value for fiber loss associated with each candidate RRH and a value for radio loss associated with each candidate RRH. The selection component 306 can employ an additive algorithm that combines the fiber loss and radio loss values for each candidate RRH and selects the RRH having the lowest total loss value. It should be appreciated that high RSSI/RSRP measurements equate to low radio loss values. Accordingly, as received signal strength of an RRH increases, radio loss for the RRH decreases.

In yet another aspect, the selection component 306 can determine total amount of data loss values associated with each candidate RRH based on the fiber loss data and radio loss data as described above, and select one or more of the candidate RRHs for access that have total amount of data loss value that is below a predetermined threshold value.

In other aspects, the selection component 306 can examine fiber loss data and radio loss data separately when determining which RRH to select for access. For example, the selection component 306 can select an RRH from the plurality of candidate RRHs that has the lowest fiber loss value and has a radio loss value below a predetermined threshold value. In another example, the selection component 306 can select an RRH from the plurality of candidate RRHs that has the lowest radio loss value and a fiber loss value below a predetermined threshold. Still in yet another example, the selection component 306 can select an RRH from the plurality of candidate RRHs that has a fiber loss value below a first threshold value and a radio loss value below a second threshold value.

Coordination component 310 is configured to facilitate CoMP and/or HO based on collected fiber loss data and/or radio loss data for one or more RRHs in a wireless network in which the mobile device 302 is employed. In an aspect, the coordination component 310 is configured to determine when a CoMP or HO operation should be employed based on the collected data. For example, the coordination component 310 can analyze measurement data indicative of data loss (e.g., based on fiber loss and/or radio loss) associated with an RRH currently serving the mobile device and data loss associated with neighboring RRHs. The coordination component 310 can further provide this measurement data to reporting component 312 in response to discrepancies between the data (e.g., when the servicing RRH has greater data loss than neighboring RRHS). The reporting component 312 can further report the measurement data to a serving network entity for determining and/or implementing CoMP and/or HO operations based on the measurement data.

For example, when mobile device 302 is configured with CoMP measurement data, it can consider the fiber loss with when evaluating an A3 event. A3 event is a 3GPP specification event where a UE compares the serving cell (e.g., serving RRH) and neighboring cell (e.g., neighboring RRHs) signal strength. During comparisons, several offset such like interfrequency offset could be added. An A3 event can be analyzed using the following formula:

$$Mn+Ofn+Ocn-Hys>Mp+Ofp+Ocp+\text{Off} \qquad \text{Formula (I)},$$

wherein, Mn is the measurement result of the neighboring cell, not taking into account any offsets; Ofn is the frequency specific offset of the frequency of the neighbor cell (e.g., offsetFreq as defined within measObjectEUTRA corresponding to the frequency of the neighbor cell); Ocn is the cell specific offset of the neighbor cell (e.g., cellIndividualOffset as defined within measObjectEUTRA corresponding to the frequency of the neighbor cell) and set to zero if not configured for the neighbor cell; Mp is the measurement result of the serving cell, not taking into account any offsets; Ofp is the frequency specific offset of the serving frequency (i.e. offsetFreq as defined within measObjectEUTRA corresponding to the serving frequency); Ocp is the cell specific offset of the serving cell (i.e. cellIndividualOffset as defined within measObjectEUTRA corresponding to the serving frequency), and is set to zero if not configured for the serving cell; Hys is the hysteresis parameter for this event (i.e. hysteresis as defined within reportConfigEUTRA for this event); and Off is the offset parameter for this event (i.e. a3-Offset as defined within reportConfigEUTRA for this event).

When considering fiber loss data, an A3 event would be modified in Formula (I) as follows:

$$M_n+O_{fn}+O_{cn}-H_{ys}-F_s>M_p+O_{fp}+O_{cp}+O_{ff}$$

where $F_s$ is the fiber loss from neighboring cells. According to this example, the reporting component 312 can be configured to report the measurement data if a modified A3 event satisfied.

In another aspect, the coordination component is 310 is configured to select and/or initiate a CoMP scheme for communication by the mobile device 302 based in part of the fiber loss data and the radio loss data. According to this aspect, one or more of the plurality of RRHs from which data was collected can be included in the CoMP cooperating set for communication by the mobile device. In yet another aspect, the coordination component is 310 is configured to select and/or initiate a HO operation for communication by the mobile device 302 based in part of the fiber loss data and the radio loss data. For example, when the mobile device 302 is associated with a first one or a plurality of RRHs in a wireless network, the coordination component 310 can determine if the mobile device should access another one of the plurality of RRHs based in part on the fiber loss data and/or the radio loss data. According to this example, the coordination component can determine that a neighboring RRH has less data loss than the serving RRH and in response, initiate a HO operation to the neighboring RRH.

In another aspect, the reporting component 312 can report fiber loss data and radio loss data to the serving RRH in a response to a determination by the coordination component 302 (or other component of mobile device 302) the serving RRH has reduced performance (e.g., based on fiber loss data and/or radio loss data). The serving RRH can then select another RRH to serve the mobile device 302. In an aspect, the serving RRH can select another RRH to serve the mobile device based in part on fiber loss data and radio loss data associated with neighboring RRHs.

In an aspect, mobile device 302 can further include inference component 314 to provide for or aid in various inferences or determinations associated with cell selection, CoMP decisions and HO decisions based in part on fiber loss data and radio loss data. In an aspect, inference component 314 can infer ranking information to associate candidate RRHs based on fiber loss data and radio loss data. The inference component 314 can further employ the ranking information to infer optimal cell selection and CoMP and HO decisions including CoMP and HO reporting and CoMP scheme initiation and design.

In order to provide for or aid in the numerous inferences described herein by inference component 314 (and additional inference component described herein including inference component 1016 and inference component 1512), can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 4:
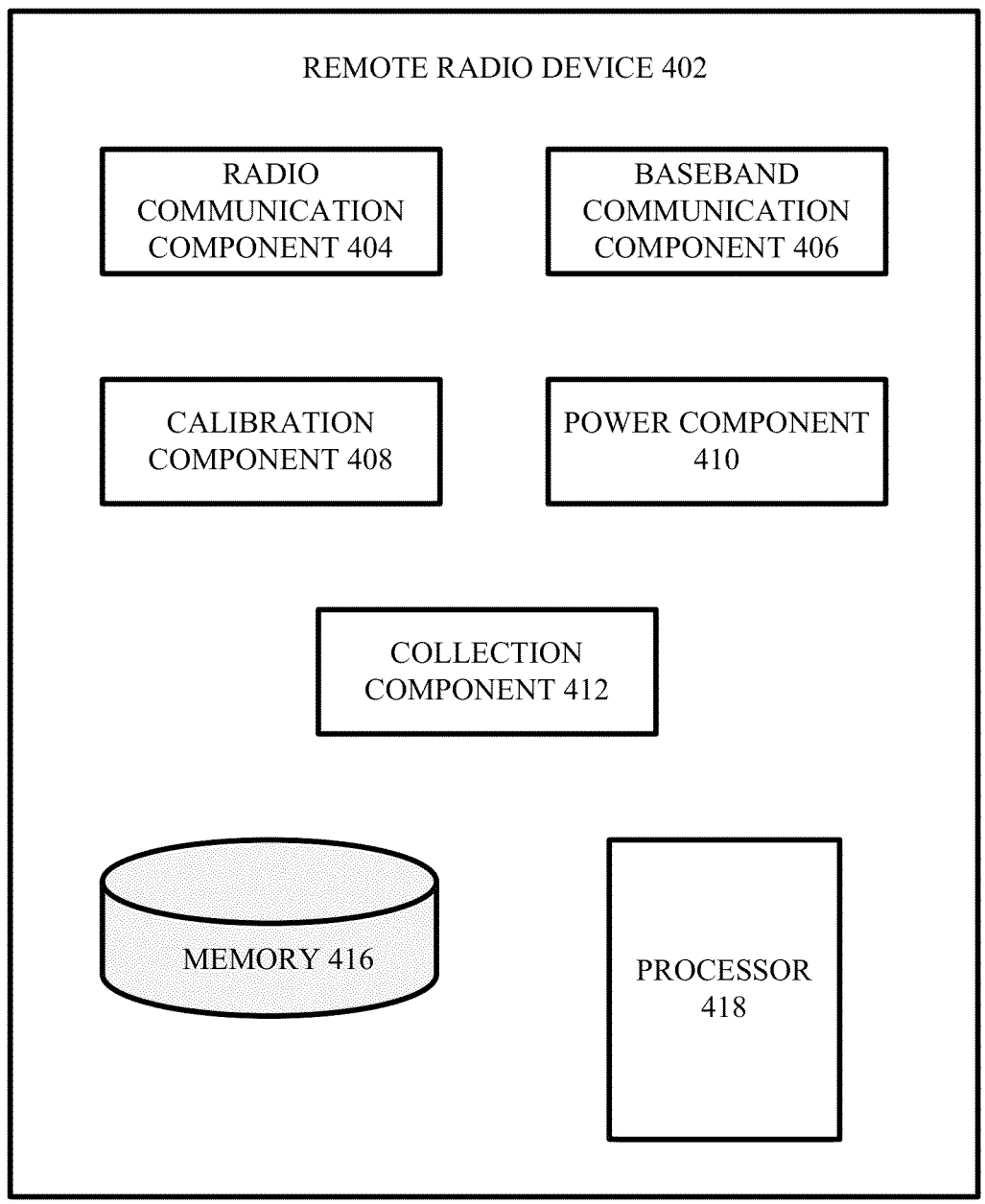
FIG. 4 presents an example RRH capable of operating in accordance with framework 200 according to a first embodiment and various aspects described herein.

Referring now to FIG. 4, presented is an example remote radio device (e.g., RRH) 402 capable of operating in accordance with framework 200 according to the first embodiment. RRH 402 can include one or more of the structure and functionality of remote radio devices 204-212 and vice versa. Repetitive description of like elements employed in respective embodiments of systems and devices described herein are omitted for sake of brevity.

As noted above, in the first embodiment, a plurality of RRHs deployed in a cellular network (e.g., RRHs 112 of network 100, RRHs 204-212 and the like), connected to one or more macro base stations via cables, broadcast fiber loss data representative of data loss over the respective cables. RRH 402 represents an example one of these plurality of RRHs according to the first embodiment. The broadcasted fiber loss data is received by mobile devices deployed in the network, such as mobile device 302. The mobile devices, (e.g., mobile device 302 and the like), can in turn employ the fiber loss data when selecting one of the RRHs to access (e.g., possibly RRH 402) and/or when choosing to access an alternative base station. The mobile devices (e.g., mobile device 302 and the like) can also employ the fiber loss data to initiate and/or facilitate a CoMP and/or a HO operation.

RRH 402 can include can include radio communication component 404, baseband communication component 406, calibration component 408, power component 410, and collection component 414. RRH 402 can also include memory 416 for storing computer executable components and instructions. RRH 402 can further include a processor 418 to facilitate operation of the instructions (e.g., computer executable components and instructions) by RRH 402.

Radio communication component 404 can include one or more radio frequency RF antennas configured to transmit and receive data to and from another device, such as a UE. Baseband communication component 406 includes a hardware and software components associated with performing baseband communications between RRH 402 and a macro base station to which it is connected via a fiber cable as described herein. In particular, the baseband communication component 406 is configured to communicate with a macro cell base station device using a RoF cable.

Calibration component 408 component is configured to determine a performance level of the RRH based at least in part on data transmission loss associated with transmission of data over the fiber cable. In some aspects, the calibration component 408 can collect data representative of data loss over the fiber cable connected thereto and forward this data to the reporting component 414. The radio communication component 404 in turn is configured to broadcast this fiber loss data to surrounding UEs (e.g., using a SIBx). In other aspects, the calibration component 408 is configured to calculate a fiber loss value based on the various factors discussed infra and provide this fiber loss value to the radio communication component 404 for broadcasting thereof. For example, the calibration component 408 can calculate a fiber loss value associated with RRH 402 that is based on inter-cell interference, network quality, and loading of the RRH 402. In an aspect, the calibration component 408 can increase its associated fiber loss as its loading increases. For example, if RRH 402 loading is high and its fiber is out of usage, then it could adopt high fiber loss to restrict incoming UEs. This behavior may let incoming UEs know that they may suffer a big packet loss if selecting RRH 402.

In other aspects, the calibration component 408 can calculate a performance score for the RRH 402 that reflects overall data loss associated with the RRH 402. According to this aspect, the performance score can reflect fiber loss as well as radio loss and additional performance factors (e.g., transmission power) associated with the RRH that influence overall data loss. The radio communication component 404 can further broadcast this performance score to surrounding UEs. In some aspects, the broadcasted performance score can be embodied in a SIBx message that indicates the basis for the score. The SIBx message can be periodically broadcasted and directs the UE to analyze the score in a particular manner. For example, although an RRH may have poor fiber loss, the RRH overall performance score could be high. According to this example, the SIBx message could indicate that the UE should select the RRH based on the overall performance score without separate attention to the fiber loss portion of the score alone.

In an aspect, the radio communication component 404 is configured to broadcast fiber loss and/or overall RRH data loss on a scheduled basis. For example, radio communication component can broadcast fiber loss every minute, every 30 seconds, every second, every 30 miliseconds (ms) and so on. In a preferred embodiment, the radio communication component 404 broadcasts fiber loss data every 40 ms.

It is noted that if RRH 402 broadcasts a relatively large fiber loss less UEs would camp on that node and the deployment may be inefficient. This situation may be inevitable because partial RRHs are often used to extend macro cell coverage using long distance fibers. In order to circumvent the above scenario, RRH 402 can compensate for its high fiber loss by increasing its transmission power. According to the aspect, RRH can include power component 410 to increase its transmission power in response to an increase in fiber loss and/or in response to a decrease in the number of UEs accessing the RRH over a predetermined period. The RRH 402 can further broadcast an overall data loss performance score as described above, that reflects this increase in transmission power.

Figure 5:
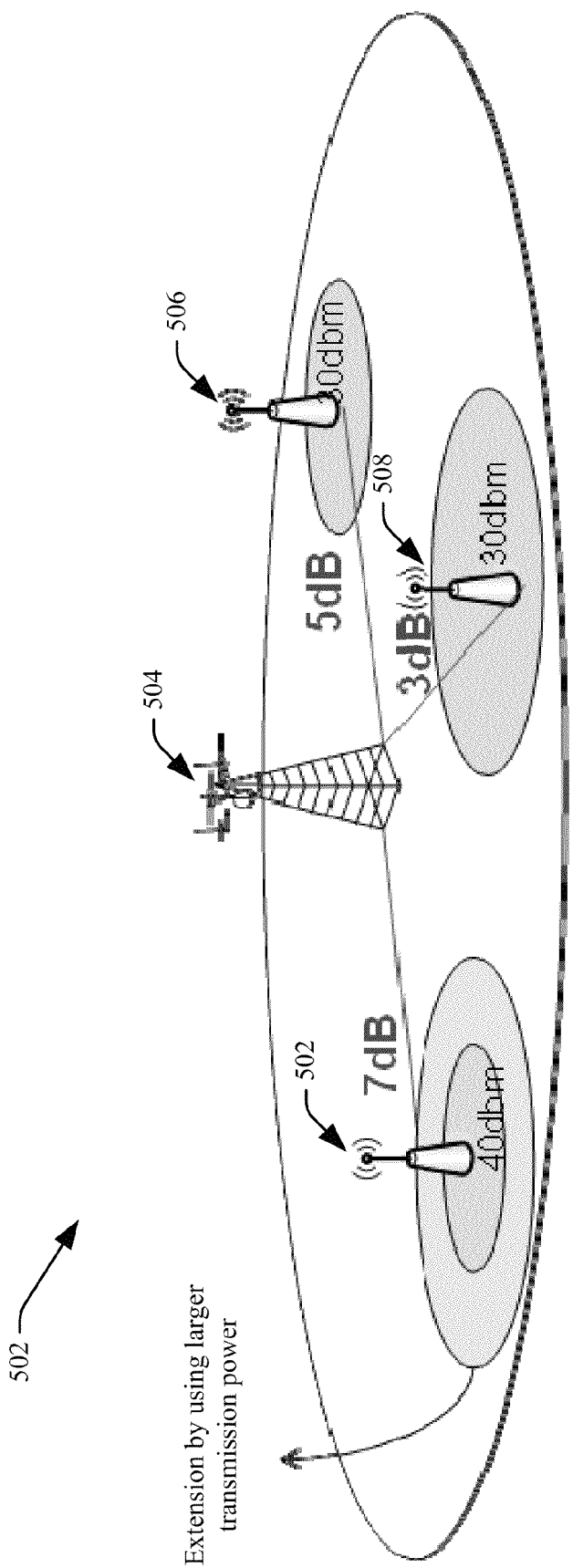
FIG. 5 demonstrates an example scenario in which an RRH increases its transmission power to boost its associated fiber loss value, in accordance with various aspects and embodiments described herein.

FIG. 5, demonstrates an example scenario in which an RRH, such as RRH 402, increases its transmission power to boost its associated fiber loss value. In FIG. 5, a wireless network 500 is depicted with a macro base station 504 and three RRHs 502, 506, and 508, respectively connected to the macro base station 504 via fibers. RRH 506 has an associated fiber loss value of 5.0 dB and a transmission power of 30.0 dBm. RRH 508 has an associated fiber loss value of 3.0 dB and a transmission power of 30 dBm and RRH 502 has an associated fiber loss of 7.0 dB and a transmission power of 40.0 dBM. According to this example, RRH 502 increased its transmission power from 30.0 dBm to 40.0 dBm to achieve a total associated data loss of 7.0 dB. As a result, the overall performance of RRH 502 is improved to increase the camping probability.

As noted above, radio communication component 404 is configured to broadcast fiber loss data and/or overall data loss performance information to UEs to facilitate selection. This fiber loss and/or overall performance data can further be employed by UEs in association with making CoMP and HO decisions. In an aspect, in order to provide an accurate reflection of network element states for use in RRH selection and CoMP and HO reporting and decision making by a UE (e.g., when deciding when to initiate CoMP and HO operations), RRH 402 can employ collection component 414 to gather information regarding fiber loss from neighboring RRHs. The information can include cell IDs for the neighboring RRHs and their respective fiber loss/overall performance loss data. The radio communication component 404 can further indicate the information to a UE that indicates not only fiber loss associated with RRH 402, but fiber loss associated with the identified neighboring RRHs.

Figure 6:
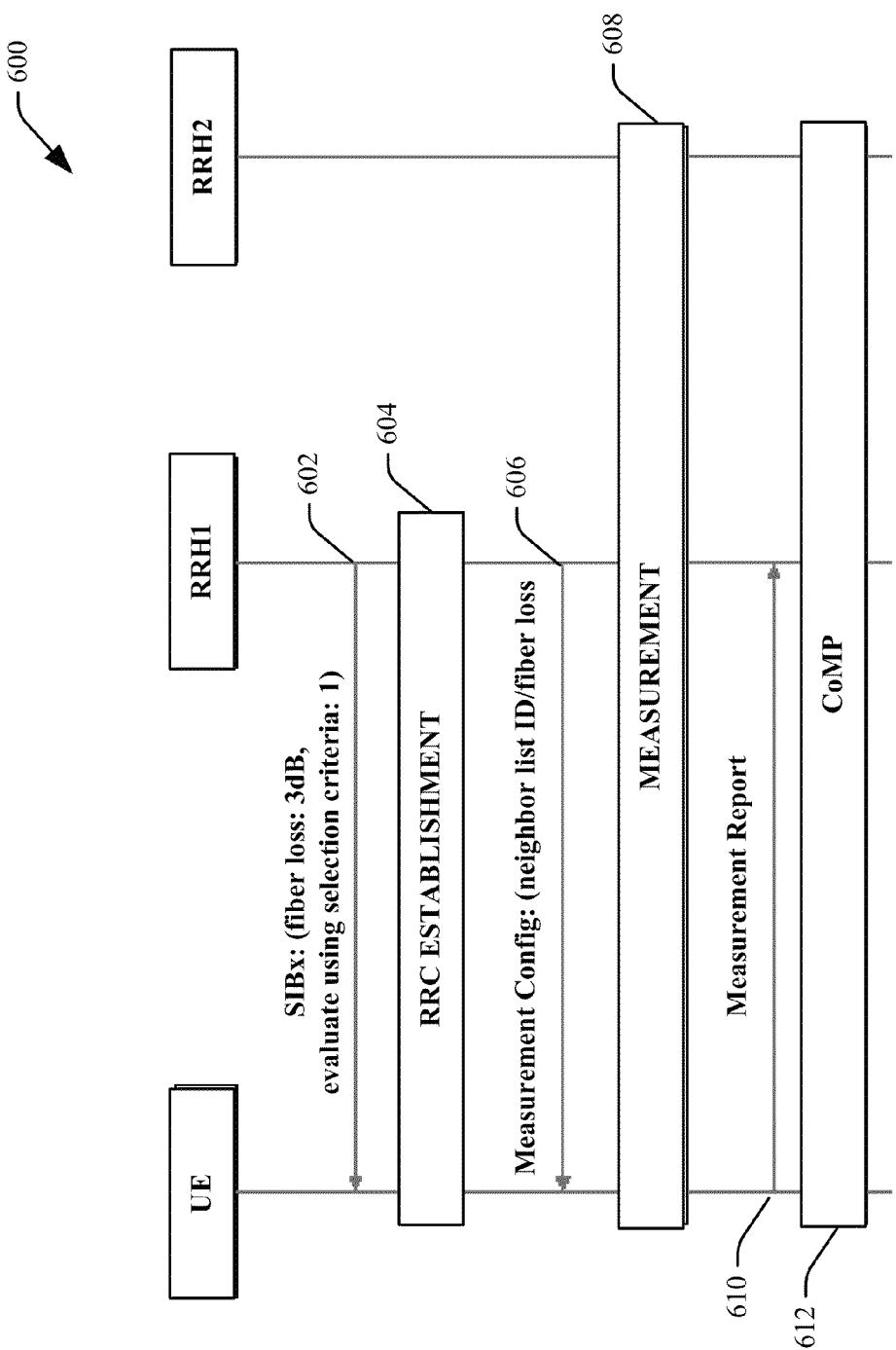
FIG. 6 demonstrates an example signaling procedure between UEs and RRHs in accordance with the first embodiment and various aspects described herein.

FIG. 6 demonstrates an example signaling procedure 600 between UEs (e.g., mobile device 302) and RRHs (e.g., RRH 402 and the like) in accordance with the first embodiment. At 602, RRH1 broadcasts a SIBx message that is received by a UE. The SIBx message can indicate a fiber loss value representative of an amount of data lost in association with transmission over a fiber cable connecting the RRH1 to a macro base station. In an aspect, the SIBx message can also indicate criteria (e.g., what algorithm to employ) when evaluating the fiber loss data by the UE. According to this example, the SIBx message indicates that the RRH1 is associated with a 3.0 dB fiber loss that should be evaluate using selection criteria 1. Selection criteria 1, could for example be associated with an algorithm that evaluates total data loss.

At 604, remote resource control (RRC) is established between the RRH1 and the UE. At 606, RRH1 requests UE to perform measurement while a list of the neighboring RRHs by an ID number and their associated fiber loss is also provided by RRH1. At 608, measurements may be taken by the UE, RRH1 and/or RRH2 based on the configurations. At 610, the UE transmits a measurement report to RRH1. At 612, CoMP is initiated based on the measurement report.

In view of the example systems and/or devices described herein, example methods that can be implemented in accordance with the disclosed subject matter can be further appreciated with reference to flowcharts in FIGS. 7-9, 13-14 and 16-17. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 7:
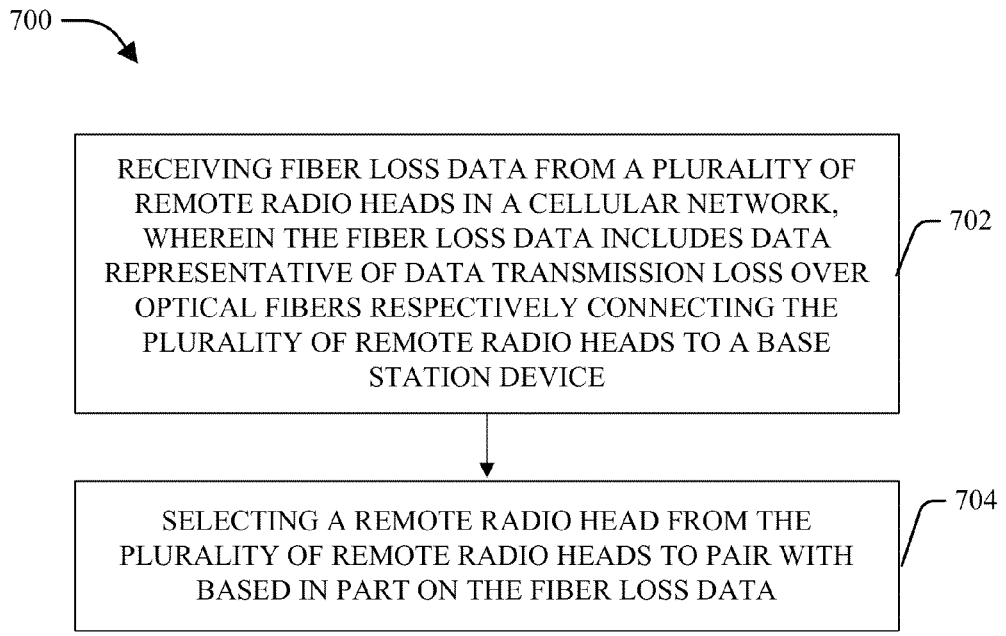
FIG. 7 illustrates a flow chart of an example method for performing cell selection by a UE (or selection of an RRH from a plurality of RRHs) in accordance with the first embodiment and various aspects described herein.

FIG. 7 illustrates a flow chart of an example method 700 for performing cell selection by a UE (or selection of an RRH from a plurality of RRHs) in accordance with the first embodiment. At 702, fiber loss data is collected from a plurality of remote radio heads in a cellular network, wherein the fiber loss data includes data representative of data transmission loss over optical fibers respectively connecting the plurality of remote radio heads to a base station device (e.g., using collection component 306). At 704, a remote radio head is selected from the plurality of remote radio heads to access based in part on the fiber loss data (e.g., using selection component 308).

Figure 8:
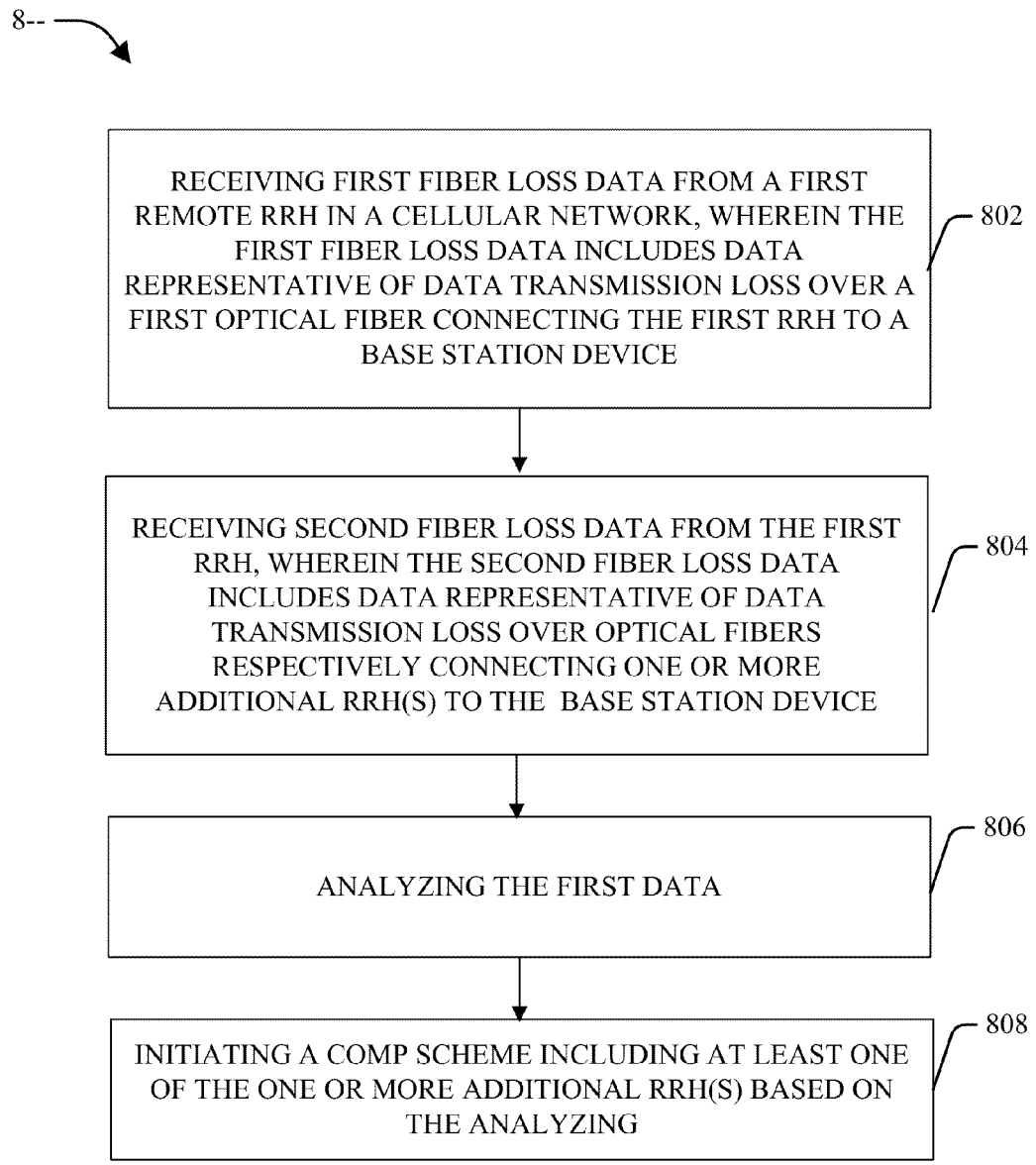
FIG. 8 illustrates a flow chart of an example method for reporting measurement data by a UE to initiate CoMP in accordance with various aspects and embodiments described herein.

FIG. 8 illustrates a flow chart of an example method 800 for reporting measurement data by a UE to initiate CoMP in accordance with aspects described herein (e.g., using collection component 304). At 802, first fiber loss data is received from a first RRH in a cellular network. The first fiber loss data can include data representative of data transmission loss over a first optical fiber connecting the first RRH to a base station device. At 804, second fiber loss data is received from one or more neighboring RRHs (e.g., using the collection component 304). The second fiber loss data can include data representative of data transmission loss over optical fibers respectively connecting one or more neighboring RRHs to the base station device. At 806, the first and second data transmission loss information is analyzed (e.g., using the coordination component 310). Then at 808, a CoMP is initiated based on the analysis (e.g., using the coordination component 310). The CoMP can include at least one of the one or more additional RRH(s).

Figure 9:
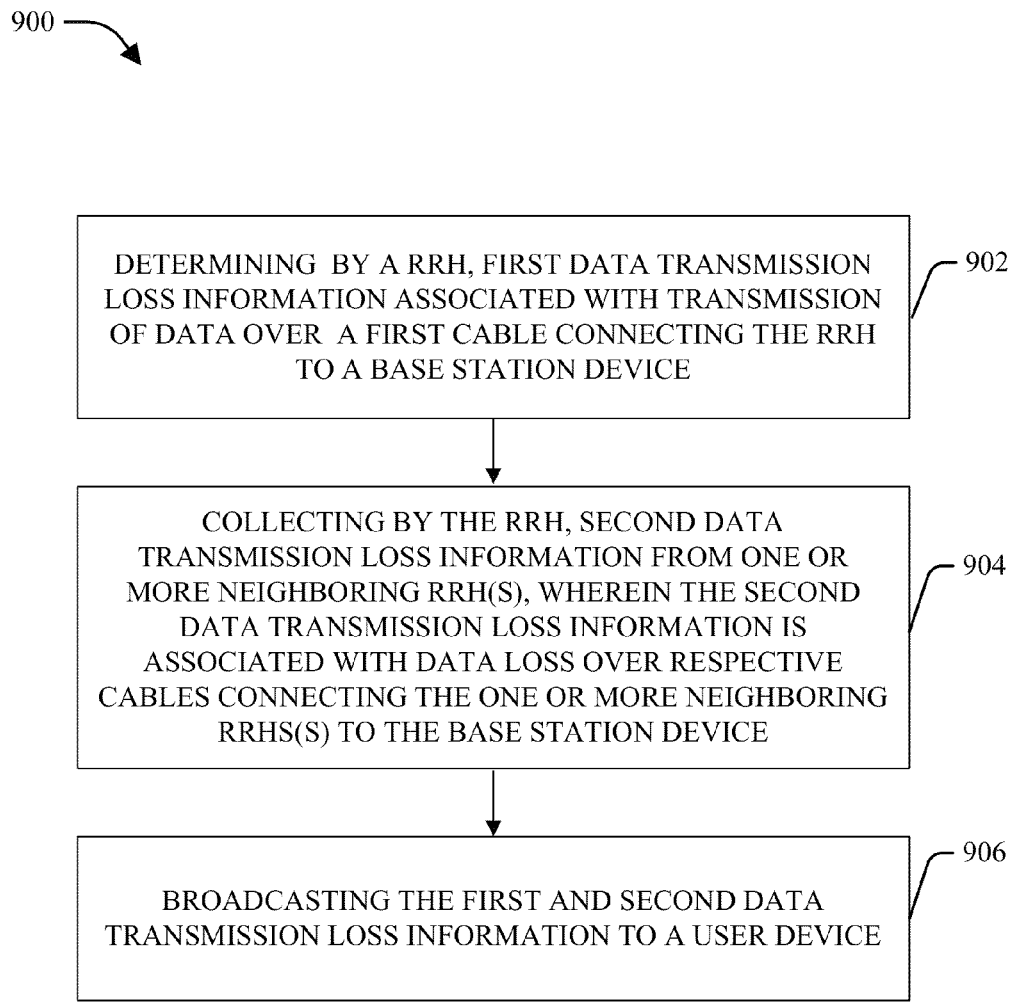
FIG. 9 illustrates a flow chart of an example method for reporting fiber loss data by an RRH in accordance with various aspects and embodiments described herein.

FIG. 9 illustrates a flow chart of an example method 900 for broadcasting fiber loss data by an RRH in accordance with aspects described herein. At 902, an RRH determines first data transmission loss information associated with transmission of data over a first cable connecting the RRH to a base station device (e.g., using calibration component 408). At 904, the RRH collects second data transmission loss information from one or more neighboring RRHs (e.g., using collection component 414). The second data transmission loss information is associated with data loss over respective cables connecting the one or more neighboring RRH(s) to the base station device. At 906, the first and second data transmission loss information is broadcasted to a user device (e.g., using reporting component 412).

Figure 10:
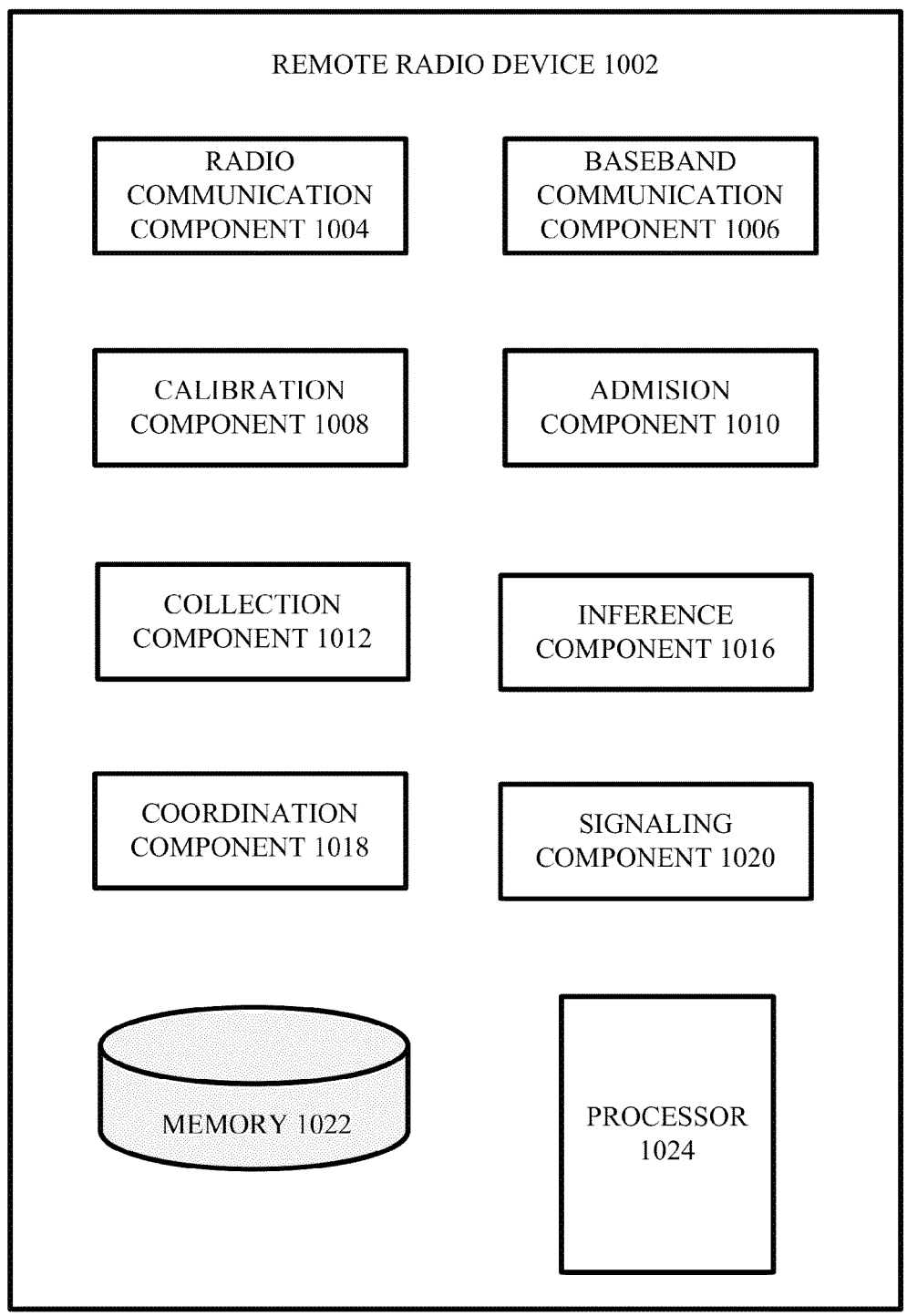
FIG. 10 presents an example RRH capable of operating in accordance with framework 200 according to a second embodiment and various aspects described herein.

Referring now to FIG. 10, presented is an example remote radio device (e.g., RRH) 1002 capable of operating in accordance with framework 200 according to a second embodiment. RRH 1002 can include one or more of the structure and functionality of RRHs described herein (e.g., RRHs 204-212 and RRH 402) and vice versa. Repetitive description of like elements employed in respective embodiments of systems and devices described herein are omitted for sake of brevity. In the second embodiment, rather than broadcasting fiber loss data to UEs and allowing the UEs to control RRH selection and CoMP/HO reporting and decisions, the plurality of RRHs deployed in a cellular network (e.g., RRHs 112 of network 100, RRHs 204-212 and the like) can control RRH selection and CoMP/HO operations. According to the second embodiment, a UE can perform traditional cell selection and CoMP reporting techniques based on radio loss data alone. However, an RRH, such as RRH 1002, can restrict cell selection options and control CoMP/HO operations based on calibrated fiber loss data.

In an example, referring back to FIG. 2, where RRH 1002 resembles RRH 204, RRH 204 can determine its fiber loss based on various factors discussed herein (e.g., inter-cell interference and other conditions, transmission power, and etc.). A mobile device 202 may select RRH 204 for access based on radio loss data alone using conventional cell selection techniques (e.g., based on RSSI/RSRP data). When the mobile device 202 selects RRH 204, the mobile device can perform random access (RA) to acquire synchronization. This RA can be interpreted by the RRH 204 as a request by the mobile device 204 to access RRH 204. The RRH 204 can either accept or reject the request based in part on its fiber loss data. The rejection can be performed by ignoring the request or sending a rejection message to the mobile device 202.

In an aspect, the RRH 204 may identify received signal strength power from mobile device 202 during the RA. The RRH 204 can further decide to accept or reject the request based on the received signal strength power. For example, if the received signal strength power is lower than a threshold (e.g., indicating high data loss over radio transmissions), the RRH 204 may reject the access. In another example, the RRH 204 can evaluate the overall anticipated data loss associated with data communications between the RRH 204 and the mobile device 202 based on received signal strength data and fiber loss data. If the received signal strength data is not high enough to compensate for the RRH's 204 fiber loss to attach a satisfied overall performance, then RRH 204 would reject the access request. According to this aspect, the RRH 204 can further indicate the reason for rejection in a rejection message to facilitate the mobile device 204 with future cell selection involving RRH 204 or another RRH.

For CoMP and HO scenarios, mobile device 202 may perform measurements to trigger CoMP and HO according to normal operation and provide the measurements to RRH 204 as a measurement report. After receiving a measurement report, RRH 204 can calibrate the values in the report by considering its fiber loss. RRH 204 can in turn perform CoMP and HO decisions based in part on the calibrated values.

For example, the serving RRH 204 can receive measurement data from mobile device 202 that facilitates CoMP and HO. For example, this measurement data can include signal strength of measured neighboring RRHs. The serving RRH 204 can determine its fiber loss data and acquire neighboring RRH's (e.g., RRHs 206-212) fiber data loss through an interface provided between base stations that facilitates exchanging information (e.g., an X2 interface). After acquisition, serving RRH 204 can also estimate radio loss information associated with transmissions between the mobile device 202 and RRH 204 as well as between mobile device 202 and the neighboring RRHs. The serving RRH 204 can then perform CoMP and HO decisions based on the determined and collected information, including the measurement data, the fiber loss data for RRH 204, the fiber loss data for neighboring RRHs, and radio loss information associated with transmissions between the mobile device 202 and RRH 204 as well as between mobile device 202 and the neighboring RRHs.

In an aspect, in order to estimate radio loss information associated with transmissions between the mobile device 202 and RRH 204 as well as between mobile device 202 and the neighboring RRHs, the RRH 204 can identify a location of mobile device 202 (e.g., using global position system (GPS) techniques, triangulation, or other locating mechanisms). The RRH 204 can also receive information regarding channel quality (e.g., channel quality indicators (CQIs)) between the mobile device 202 and RRH 204 as well as between the mobile device 202 and neighboring RRHs. The serving RRH 204 can further estimate radio loss information associated with transmissions between the mobile device 202 and RRH 204 as well as between mobile device 202 and the neighboring RRHs based on the mobile device location and channel quality information. In another aspect, the serving RRH 204 can initiate mobile device sounding to trigger the mobile device 202 to send out a sounding reference signal. Neighboring RRHs 206-212 could perform radio loss measurements and fiber loss measurements upon receiving the sounding signal and perform calibration separately. The neighboring RRHs 206-212 would then report the results to the serving RRH 204. The serving RRH 204 would then perform CoMP and HO decisions based on radio loss data and fiber loss data associated therewith as well as the neighboring RRHs.

Referring back to FIG. 10, in order to facilitate the above example operations, RRH 1002 can include can include radio communication component 1004, baseband communication component 1006, calibration component 1008, admission component 1010, collection component 1012, inference component 1016, coordination component 1018, and signaling component 1020. RRH 1002 can also include memory 1022 for storing computer executable components and instructions. RRH 1002 can further include a processor 1024 to facilitate operation of the instructions (e.g., computer executable components and instructions) by RRH 1002.

Radio communication component 1004 can include the structure and function of radio communication component 404 and baseband communication component 1006 can baseband communication component 406. In an aspect, calibration component 1008 component is configured to determine a performance level of the RRH 1002 based at least in part on its fiber loss data. For example, the calibration component 1008 can calculate a fiber loss value based on the various factors discussed infra (e.g., inter-cell interference, network quality, loading and etc.). The calibration component can also determine radio loss data associated with data transmission between RRH 1002 and a UE via radio communication component 1004. For example, in association with cell selection, a UE can perform RA and RRH 1002 can determine expected radio loss between the UE and the RRH 1002 based on strengths of received signals from the UE in association with the RA.

Admission component 1010 is configured to facilitate cell selection or pairing between a UE and RRH 1002 based in part on fiber loss data. Admission component 1010 is configured to receive requests from UEs desiring to access RRH 1002. For example, admission component 1010 can interpret RA from a UE as a request to access. In response to the request, the admission component 1010 is configured to analyze fiber loss data and/or radio loss data and grant or deny access based on the analysis. It is noted that the rejection threshold is RRH specific according to its fiber loss. For example, the admission component 1010 can deny access if the fiber loss data is above a predetermined threshold. In another example, the admission component can deny access if the combined fiber loss data and radio loss data indicates that an amount of data loss that is above a predetermined threshold. On the other hand, where the fiber loss is above a predetermined threshold and/or the combined fiber loss/radio loss is above a predetermined threshold, the admission component can grant or allow access.

Figure 11:
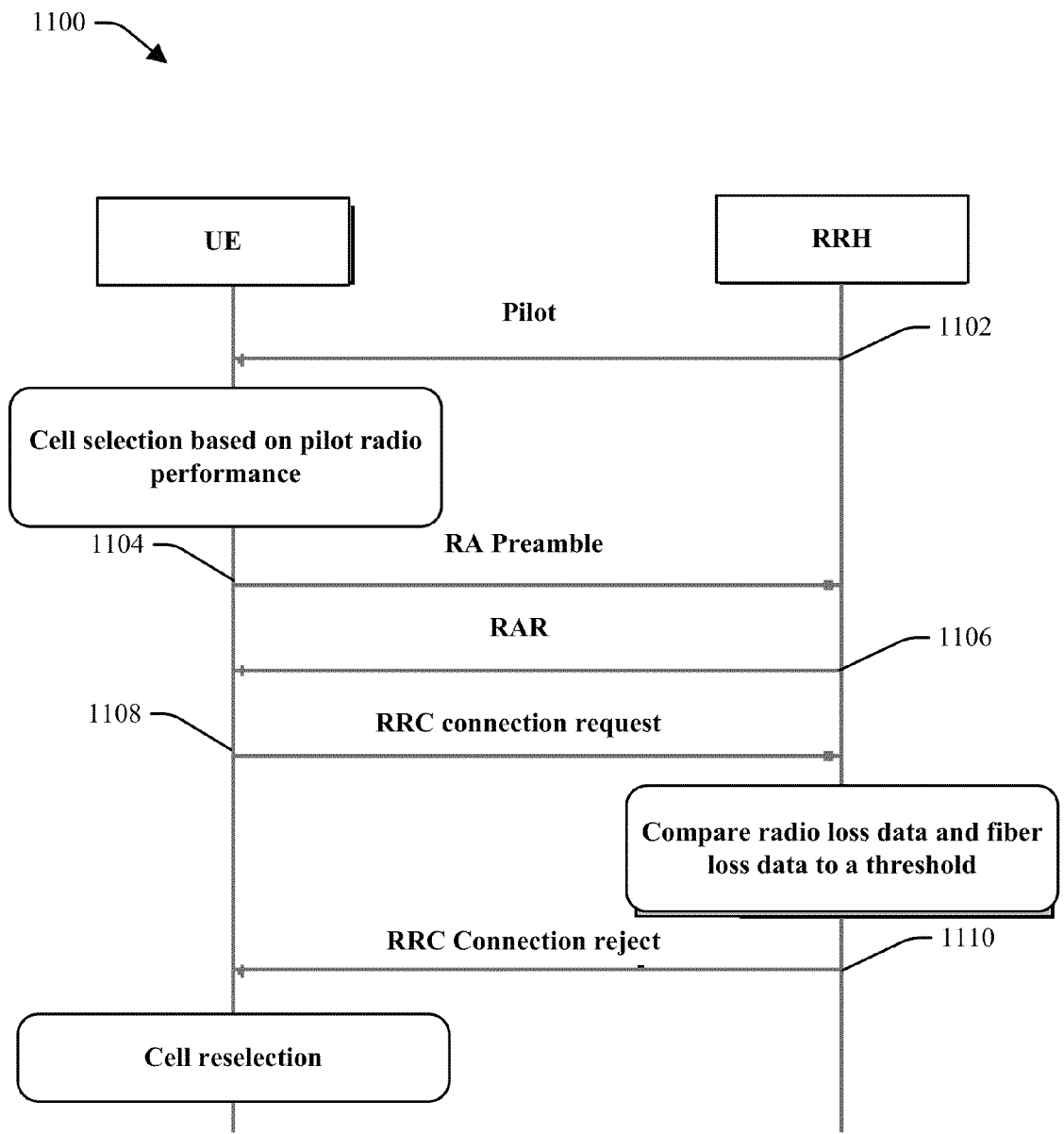
FIG. 11 demonstrates an example cell selection signaling procedure between a UE and an RRH in accordance with the second embodiment and various aspects described herein.

FIG. 11 demonstrates an example cell selection signaling procedure 1100 between a UE (e.g., mobile device 202) and an RRH (e.g., RRH 1002 and the like) in accordance with the second embodiment. At 1102, the RRH transmit a pilot or reference signal to the UE. The UE then performs cell selection based on the received signal. For example the UE can compare the received pilot signal with other pilot signals received from neighboring RRHs and select the RRH having the strongest pilot signal (e.g., highest RSSI/RSRP calculation based on the received pilot signal). When attempting to access a selected RRH, at 1104 the UE transmits a random access (RA) preamble message to the RRH. The RA preamble message can indicate the UE's access request. In turn, at 1106, the RRH transmits a random access response (RAR) message back to the UE. The RAR can convey the resources reserved for the UE along with the timing advance (TA) and ID. At 1108, the UE sends the RRC connection request message to the RRH.

At this time the RRH analyzes the RRC connection request message based on fiber loss data associated with data loss in communications between the RRH and a macro base station over a fiber connecting the RRH and macro base station and/or radio loss data associated with data loss over RF communication channels between the UE and RRH. For example, the RRH can determine strengths of received signals from the UE based on the received RA preamble signal message and/or RRC connection request message. The RRH can further determine a value representative of its fiber loss and determined whether the combined fiber loss and radio loss value is below a predetermined threshold value. In signaling procedure 1100, where the combined fiber loss and radio loss is above the predetermined threshold (e.g., too much total loss and/or radio loss is not low enough to compensate for the fiber loss) the RRH can reject the UE's access. For example, at 1110, the RRH can transmit an RRC connection rejection message back to the UE. The UE can then perform cell reselection and find another RRH or other base station for pairing.

Referring back to FIG. 10, collection component 1012 is configured to collect information from a UE that RRH 1002 is serving and one or more neighboring RRHs in association with CoMP and HO operations. For example, the collection component 1012 can collect CoMP and HO measurement report information from a UE. The calibration component 1008 can further calibrate the measurement report data based on its calculated fiber loss and fiber loss data for neighboring RRHs. Collection component 1012 is thus further configured to collect information from neighboring RRHs regarding their respective fiber loss and/or radio loss. Coordination component 1018 is configured to then make decisions regarding CoMP and HO based on based on the calibrated measurement report.

In an aspect, the collection component 1012 acquires neighboring RRH's fiber loss data through an X2 interface. After acquisition, the calibration component 1008 can estimate radio loss data associated with RF transmission between the UE an RRH 1002 as well as between the UE and the respective neighboring RRHs. In an aspect, the calibration component 1008 can employ inference component 1016 to facilitate this estimation. Inference component 1016 can make various inferences at least in accordance with inference component 314. The calibration component 1008 can then calibrate the measurement report data sent to RRH 1002 by a served UE based on its calculated fiber loss, fiber loss associated with neighboring RRHs, and/or radio loss data associated with RRH 1002 and neighboring RRHs with respect to the served UE. The coordination component 1018 can further make decisions regarding CoMP and HO based on based the calibrated measurement report. In an aspect, the coordination component can further make CoMP and HO decisions based on CQI information. The coordination component 1018 can also employ inference component 1016 to make inferences (in the various manners described herein with respect to inference component 314) regarding CoMP and HO decisions based in part on the calibrated measurement report and CQI information.

In another aspect, the collection component 1012 acquires neighboring RRH's fiber loss data and/or radio loss data by prompting the neighboring RRHs to calculate the data and send it to RRH 1002. According to this aspect, collection component 1012 can employ signaling component 1020 to initiate UE sounding to prompt a served UE to send a sounding reference or pilot signal. For example, signaling component 1020 can transmit a sounding command message to a served UE that prompts the UE to transmit a sounding reference or pilot signal. In response to receiving the pilot signal transmitted by the UE, neighboring RRHs can take radio measurements based on the received pilot signal. The neighboring RRHs can then calibrate the radio measurement data based on their individual calculated fiber loss and report the results to serving RRH 1002. Upon receipt of the individual calibrated reports from each of neighboring RRHs, the coordination component 1018 can then decide CoMP/HO operations based on the individual calibrated reports and measurement report data sent to RRH 1002 from the served UE as calibrated by calibration component 1008 based on RRH's 1002 fiber loss data.

Figure 12:
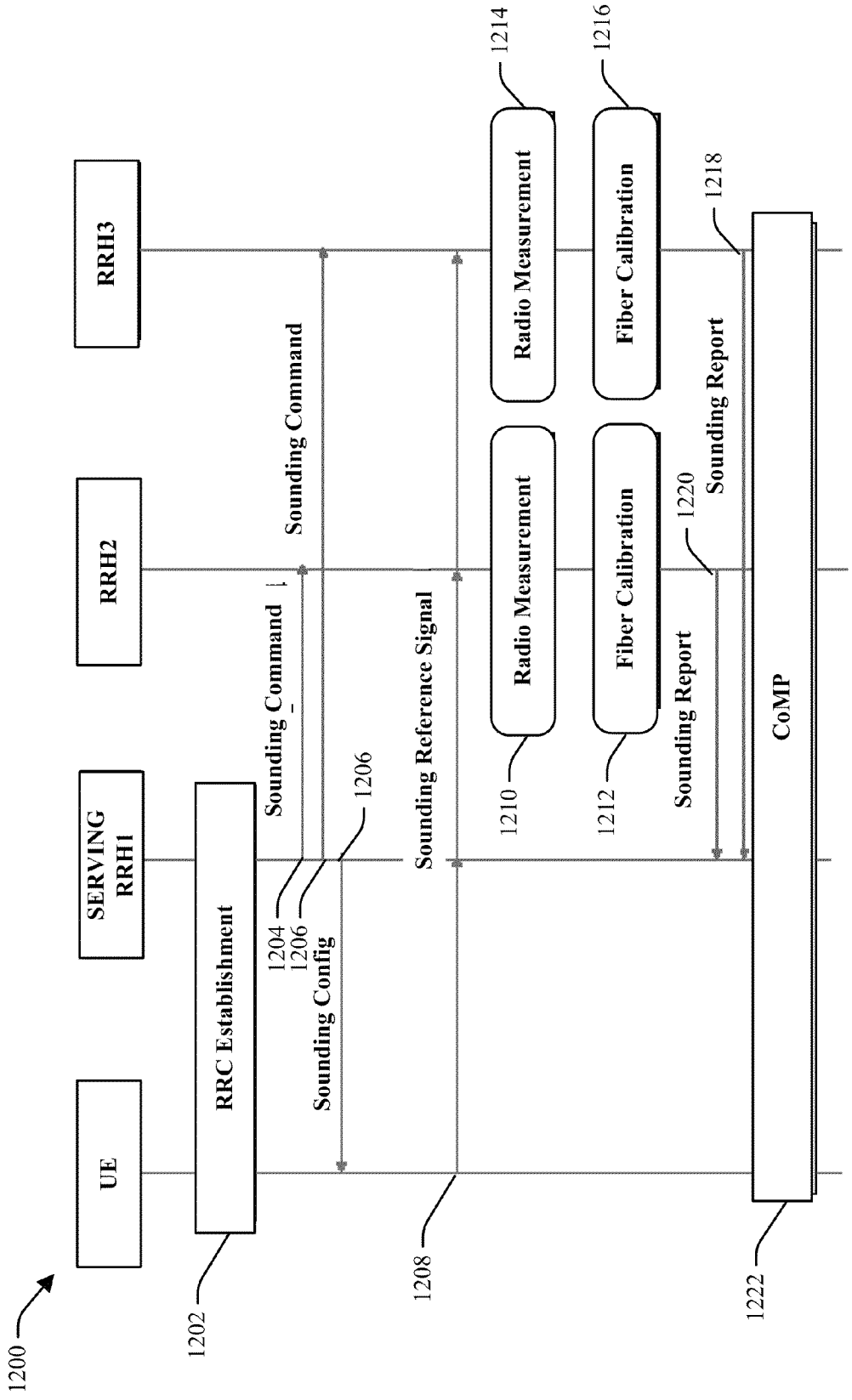
FIG. 12 demonstrates an example signaling procedure for prompting neighboring RRHs to transmit measurement data, calibrated based on fiber loss, to a serving RRH for performing CoMP and HO operations, in accordance with various aspects and embodiments described herein.

FIG. 12 demonstrates an example signaling procedure 1200 for prompting neighboring RRHs to transmit measurement data, calibrated based on fiber loss, to a serving RRH for performing CoMP and HO operations. Signaling procedure 1200 involves a UE, an RRH serving the UE, RRH1, and two neighboring RRHs, RRH2 and RRH3. At 1202, the serving RRH1 and the UE establish radio resource control (RRC) connection. In an aspect, after a predetermined period of time, the serving RRH1 requests information from RRH2 and RRH1 using a sounding command at 1204 and 1206 respectively. The RRH1 can further send a sounding configuration message to the UE at 1206 that prompts the UE to send a sounding reference signal at 1208.

Upon receipt of the sounding reference signal by RRH2, RRH2 can abide in accordance with the sounding command and take radio measurement data at 1210 based on the signal strength of the received sounding reference signal. The RRH2 can further calibrate the radio measurement data based on its fiber loss at 1212. The RRH2 can then send a sounding report with the calibrated measurement data at 1220 back to the serving RRH1. Similarly, upon receipt of the sounding reference signal by RRH3, RRH3 can abide in accordance with the sounding command and take radio measurement data at 1214 based on the signal strength of the received sounding reference signal. The RRH3 can further calibrate the radio measurement data based on its fiber loss at 1216. The RRH3 can then send a sounding report with the calibrated measurement data at 1218 back to the serving RRH1. Upon receipt of the calibrated measurement data from RRH2 and RRH3 in via their respective sounding reports, at 1222, the serving RRH1 can determine and implement CoMP operations with respect to the UE, serving RRH1, RRH2, and RRH3.

Figure 13:
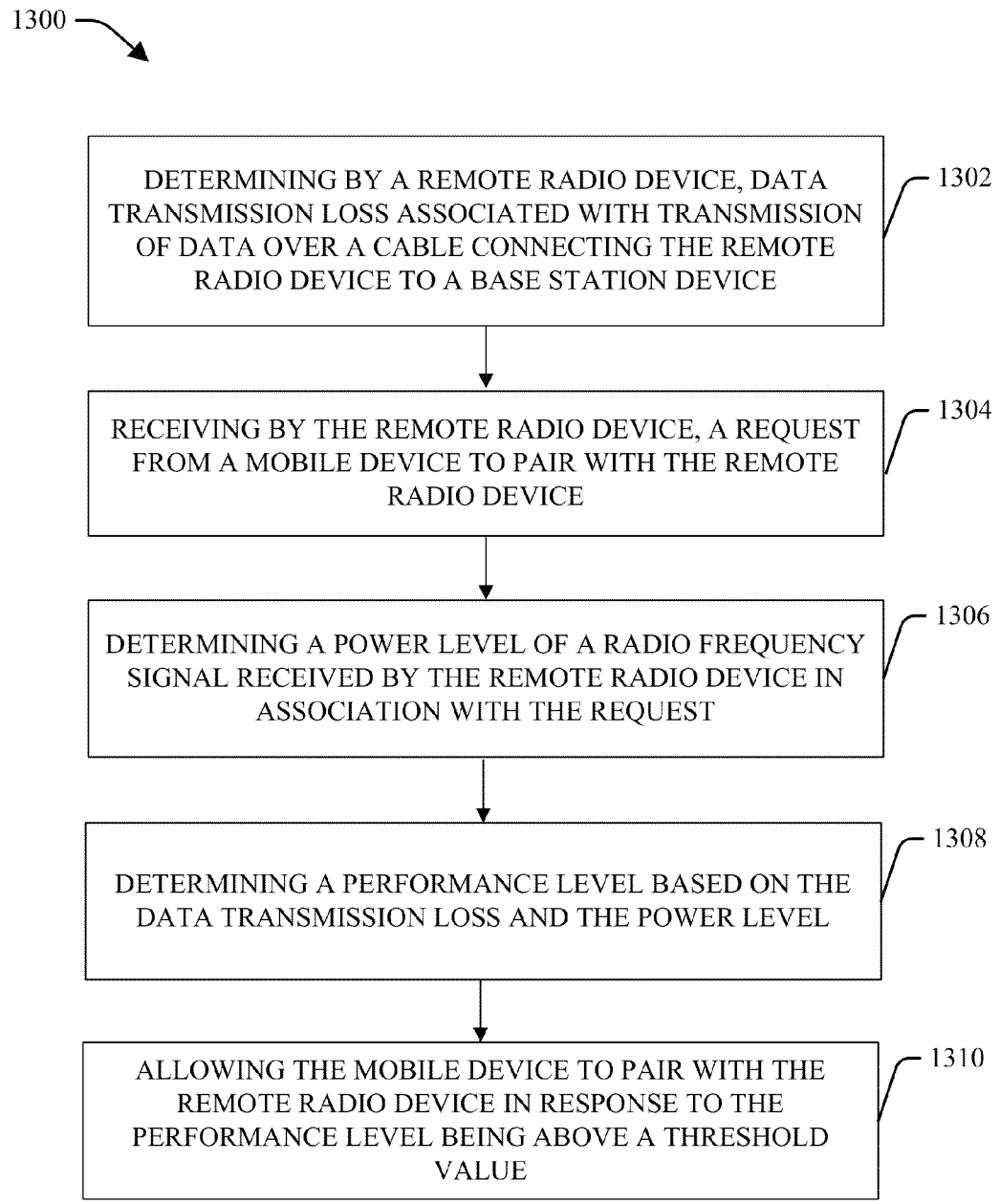
FIG. 13 illustrates a flow chart of an example method for influencing cell selection by an RRH in accordance with the second embodiment and aspects described herein.

FIG. 13 illustrates a flow chart of an example method 1300 for influencing cell selection by an RRH (e.g., RRH 1002 and the like) in accordance with the second embodiment and aspects described herein. At 1302, an RRH determines data transmission loss associated with transmission of data over a cable connecting the RRH to a base station device (e.g., determining fiber loss using calibration component 1004). At 1304, the RRH receives a request from a mobile device to access the RRH (e.g., the admission component 1010 can receive a RA preamble message and/or RRR connection request message). At 1306, the RRH can determine a power level of a radio frequency signal received by the remote radio device in association with the request (e.g., using admission component 1010 or calibration component 1008). At 1308, the RRH determines a performance level based on the data transmission loss and the power level (e.g., using calibration component 1008). For example, the lower the fiber loss and higher the received signal power level, the higher the performance level. Then at 1310, the RRH allows the mobile device to access in response to the performance level being above a threshold value (e.g., using admission component 1010).

Figure 14:
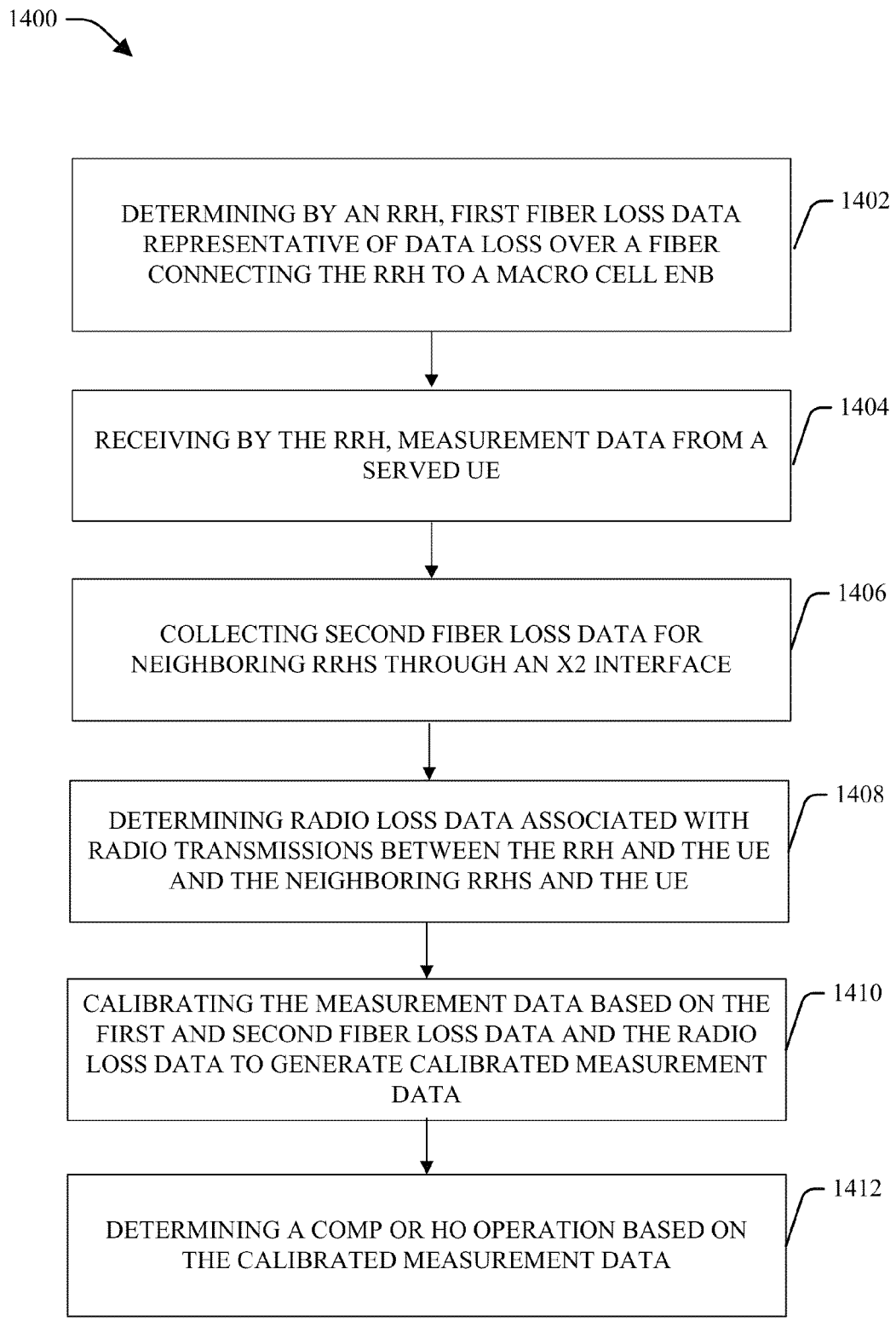
FIG. 14 illustrates a flow chart of an example method for influencing CoMP by an RRH in accordance with the second embodiment and aspects described herein.

FIG. 14 illustrates a flow chart of an example method 1400 for influencing CoMP by an RRH in accordance with the second embodiment and aspects described herein. At 1402, an RRH serving a UE determines first fiber loss data representative of data loss over a fiber connecting the RRH to a macro base station (e.g., using calibration component 1008). At 1404, the RRH receives measurement data from the UE (e.g., using collection component 1012). For example, this measurement data can include received signal strength data associated with the RRH and/or neighboring RRHsAt 1406, the RRH collects second fiber loss data for neighboring RRHs through an X2 interface (e.g., using collection component 1012). The second fiber loss data can include data representative of data loss over respective fibers connecting the respective neighboring RRHs to the macro base station. At 1408, the RRH can determine radio loss data associated with radio transmissions between the UE and the RRH and the UE and the neighboring RRHs (e.g., using calibration component 1008). At 1410, the RRH can calibrate the measurement report data based on the first and second fiber loss data and/or the radio loss data to generate calibrated measurement data (e.g., using calibration component 1008). Then at 1412, the RRH can determine a CoMP operation based on the calibrated measurement data (e.g., using coordination component 1018).

Figure 15:
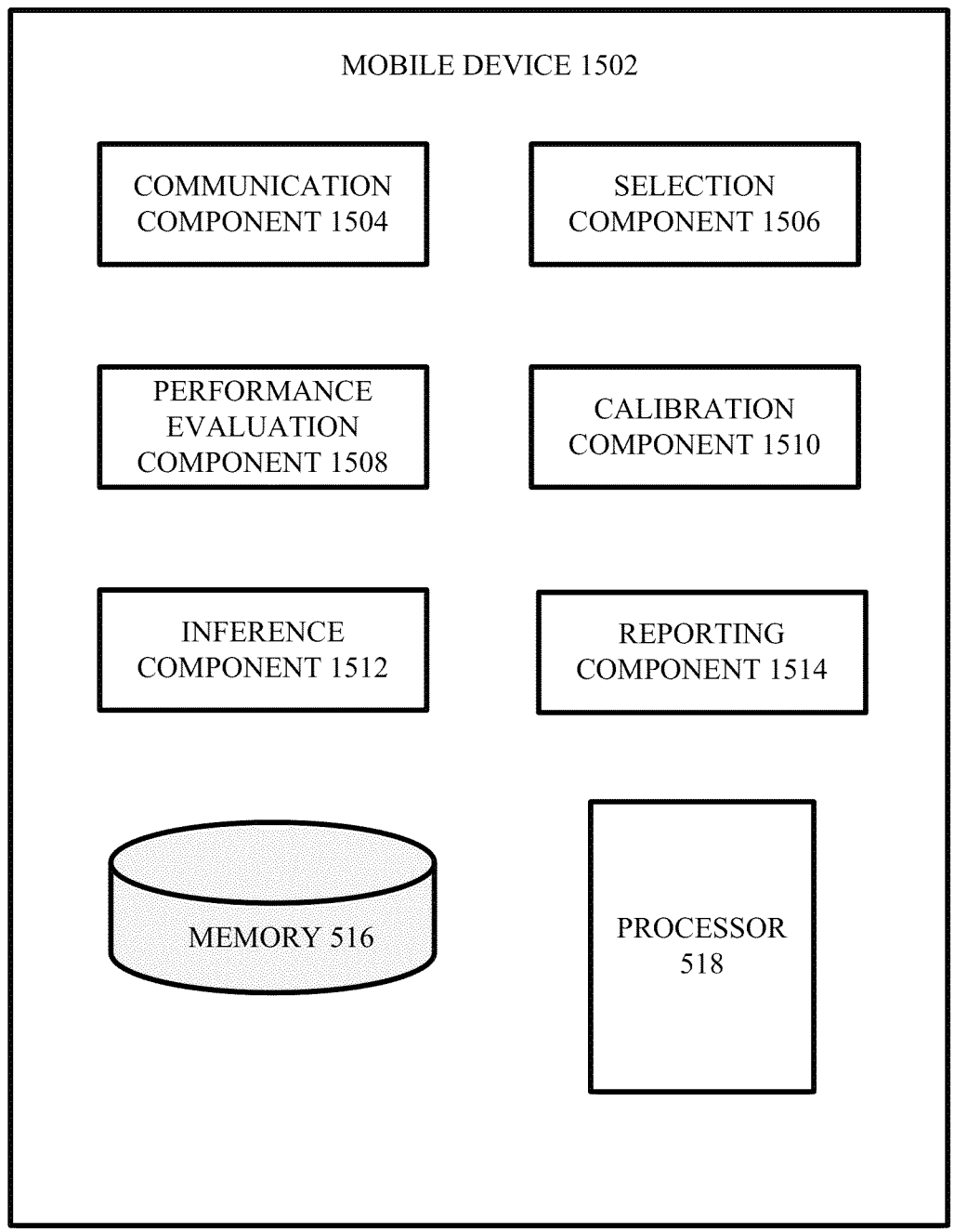
FIG. 15 presents an example mobile device capable of operating in accordance with framework 200 according to third and fourth embodiments and aspects described herein.

Referring now to FIG. 15, presented is an example mobile device 1502 capable of operating in accordance with framework 200 according to third and fourth embodiments. Mobile device 1502 can include one or more of the structure and functionality of other mobile devices described herein (e.g., mobile device 202, 302 and the like) and vice versa. Repetitive description of like elements employed in respective embodiments of systems and devices described herein are omitted for sake of brevity.

In the third embodiment, rather than determining fiber loss data by an RRH as in the previous two embodiments, the mobile device/UE 1502 can estimate fiber loss data associated with a serving RRH and report this estimated fiber loss back to the serving RRH. In an example, referring back to FIG. 2, where mobile device 1502 resembles mobile device 202, mobile device 202 can evaluate the data rate performance after selection of RRH 204. If the mobile device 202 determines there is a certain un-matching with expected radio performance, mobile device 202 can guess there is fiber loss associated with transmissions between the RRH 204 and a macro base station connected to the RRH via a cable and associate the amount of un-matching with an estimated amount of fiber loss. The mobile device 202 can then calibrate its data rate performance based on the estimated fiber loss.

Hereafter, the mobile device 202 can report back to the RRH 204, its calibrated data rate performance as opposed to data rate performance based on radio measurements alone or as opposed to the mere radio measurements alone. In an aspect, the mobile device 202 can report the actual CQI to initialize the modulation and coding scheme (MCS) adaption. In another aspect, the mobile device 202 can report its radio performance data and append an offset to the radio performance data that indicates an estimated amount of fiber loss (e.g., RSRP: 3 dBm=>1 dBm if the mobile device 202 finds there is 2 dBm difference as compared with radio measurement). In this embodiment, the calibration is transparent to RRH 204 while the RRH 204 will treat the calibrated results as normal performance data and proceed with normal operations utilizing the performance data (e.g., determining CoMP and HO operations).

In the fourth embodiment, the mobile device/UE 1502 can prompt an RRH to calibrate its performance based on fiber loss data in response to identifying a drop in data rate. In an example, referring back to FIG. 2, where mobile device 1502 resembles mobile device 202, mobile device 202 can detect a drop in the data rate over a predetermined period of time and indicate the difference to serving RRH 204. Consequently RRH 204 can take turn to calibrate its performance according to the indication (e.g., RRH 204 can determine its overall data loss based on fiber loss data and radio loss data with respect to mobile device 202). In an aspect, the mobile device 202 can indicate its drop in data rate to RRH 204 using an RRC message or a media access control (MAC) control element (CE). After indicating, the mobile device 202 will conduct measurement reporting for CoMP and HO using normal operations (e.g., the UE only reports what it measured, no additional calibration is required since the difference is reported in advanced and recorded in the network). The RRH 204 will thus receive measurement reporting data from mobile device 202 for use by the RRH 204 when performing CoMP and HO. From the RRH 204 perspective, it shall record the difference for respective UEs and that information shall be released when a UE moves away from the RRH 204, because different RRH may have different fiber loss. As compared with embodiment 3, embodiment 4 may require additional message to indicate the difference and RRH also needs to maintain the difference. However, embodiment 4 may reduce UE's complexity since it could perform legacy measurements and reporting after indications from UEs.

Referring back to FIG. 15, in order to facilitate the third and fourth embodiments mobile device 1502 can include communication component 1504, selection component 1506, performance evaluation component 1508, calibration component 1510, inference component 1512 and reporting component 1514. Mobile device 1502 can also include memory 1516 for storing computer executable components and instructions. Mobile device 1502 can further include a processor 1518 to facilitate operation of the instructions (e.g., computer executable components and instructions) by the mobile device 1502.

Communication component 1504 is configured to communicate information to and from mobile device 1502. For example, communication component 1504 can include one or more RF antennas configured to transmit and receive RF signals (e.g., to and from and RRH). Selection component 1506 is configured to perform cell selection (e.g., RRH selection) using various methods and techniques described herein. For example, selection component 1506 can operate in accordance with one or more aspects of selection component 1506. Selection component 1506 can further implement RRH selection and re-selection (as initiated by the serving RRH in accordance with a CoMP or HO scheme).

Performance evaluation component 1508 is configured to evaluate data rate performance for the mobile device when connected to an RRH. In an aspect according to the third embodiment, performance evaluation component 1508 is configured to identify differences in an expected data transmission rate based on radio measurements and an actual data transmission rate and infer an amount of fiber loss contributing to the difference. In turn the calibration component 1510 is configured to calibrate a performance level of the mobile device based in part on the fiber loss contribution to the difference. The reporting component 1514 can further report the calibrated performance level to the serving RRH for use in determining CoMP and HO operations. For example, the serving RRH can initiate an HO proceeding based on the calibrated performance level. In the HO proceeding, the communication component 1504 can receive a request from the serving RRH to end data communication with the serving RRH based on the calibrated performance level.

For example, the performance evaluation component 1508 is configured to determine a data transmission performance level for the mobile device based on current data transmissions (e.g., based on received signal strength), between the mobile device 1502 and a serving RRH. The performance evaluation component 1510 can then compare the data transmission performance level to a reference value, and infer a degree of data loss associated with data transmission between the serving RRH and a base station device (e.g., macro base station) over a cable employed by the RRH to complete data transmission to the base station device. For example, the reference value can include a predetermined anticipated data transmission rate for communications between the mobile device and the serving RRH based on radio data measurements.

In some aspects, performance evaluation component 1510 can employ inference component 1512 to facilitate inferring an anticipated data rate and thus the above noted reference value based on radio measurement data. The inference component 1512 can further facilitate inferring a degree to which a difference between an expected data rate and an actual data rate can be attributed to fiber loss. The inference component 1512 can further facilitate inferring a calibrated performance level based on the inferred degree of fiber loss contribution to the data rate.

In an aspect according to the fourth embodiment, rather than detecting a difference in an expected data transmission performance level as based on radio measurements to an actual data performance level, performance evaluation component 1510 can monitor data transmission rate for the UE and identify a drop in the data transmission rate. For example, the performance evaluation component 1508 can determine when the data transmission rate drops below a predetermined threshold over a predetermined period of time. Upon detecting a drop in data rate the performance evaluation component 1508 can determine or infer a degree to which the data transmission rate drops and infer an amount of fiber loss based on the degree to which the data transmission rate drops. The reporting component 1510 can report the degree in which the data transmission rate drops and/or the inferred fiber loss to the serving RRH. In an aspect, performance evaluation component 1508 can infer when a drop in data transmission rate is attributable to fiber loss using inference component 1512. After the reporting component 1510 reports the degree in which the data transmission rate drops and/or the inferred fiber loss to the serving RRH, the reporting component 1510 can report measurement information relating to received signal strength associated with neighboring RRHs according to normal operations.

Figure 16:
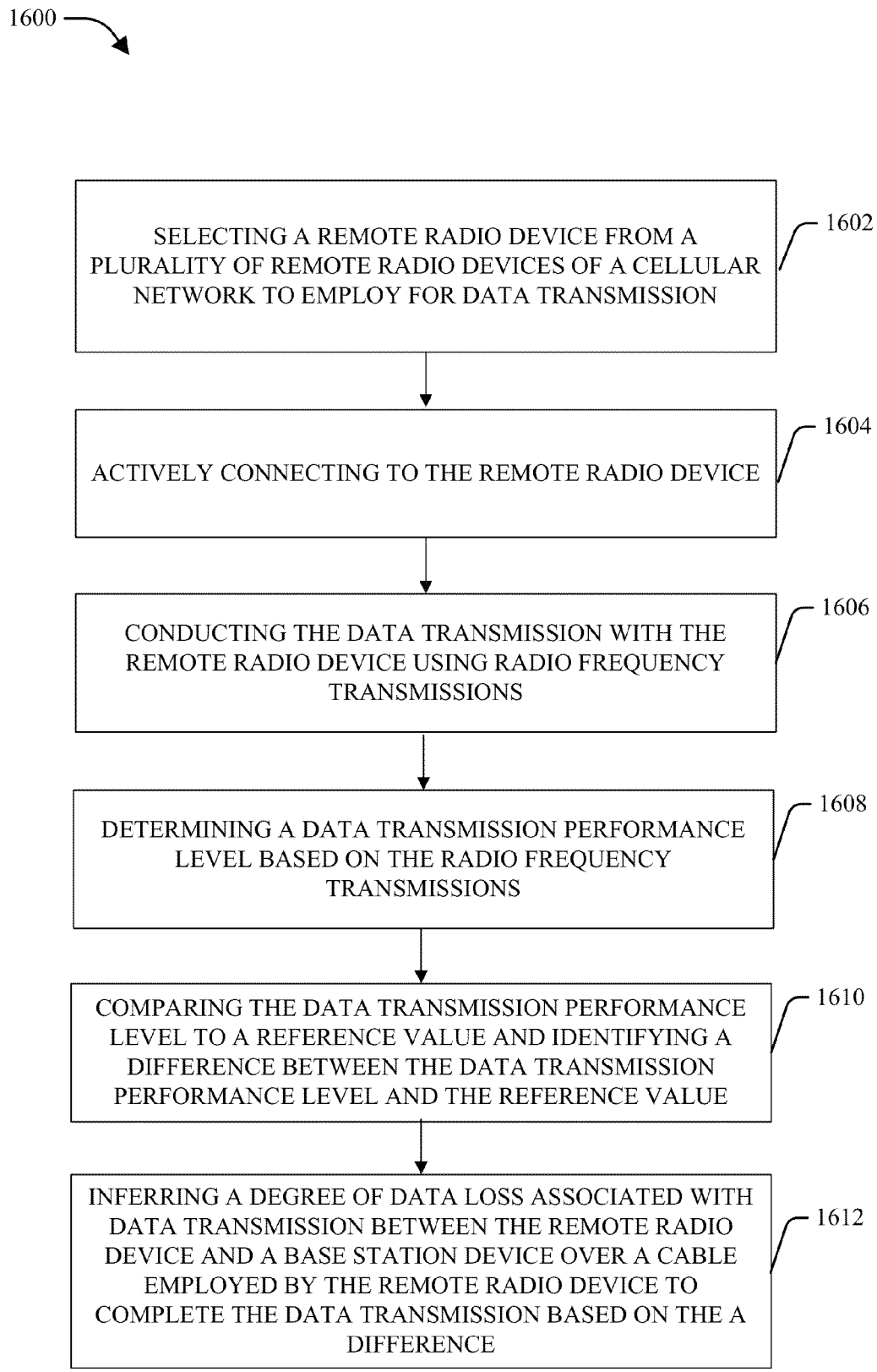
FIG. 16 illustrates a flow chart of an example method for inferring and reporting fiber loss by a UE in accordance with in accordance the third embodiment and aspects described herein.

FIG. 16 illustrates a flow chart of an example method 1600 for inferring and reporting fiber loss by a UE in accordance with in accordance the third embodiment and aspects described herein. At 1602 a mobile device selects an RRH from a plurality of RRHs of a cellular network to employ for data transmission (e.g., using selection component 1506). At 1604, the mobile device actively connects to the RRH (e.g., using communication component 1504). At 1606, the mobile device conducts data transmission with the RRH using radio frequency transmissions (e.g., using communication component 1504). At 1608 the mobile device determines a data transmission performance level based on the radio frequency transmissions, compares the data transmission performance level to a reference value and identifies a difference between the data transmission performance level and the reference value at 1610, and at 1612 infers a degree of data loss associated with data transmission between the remote radio device and a base station device over a cable employed by the remote radio device to complete the data transmission based on the difference (e.g., using performance evaluation component 1508).

Figure 17:
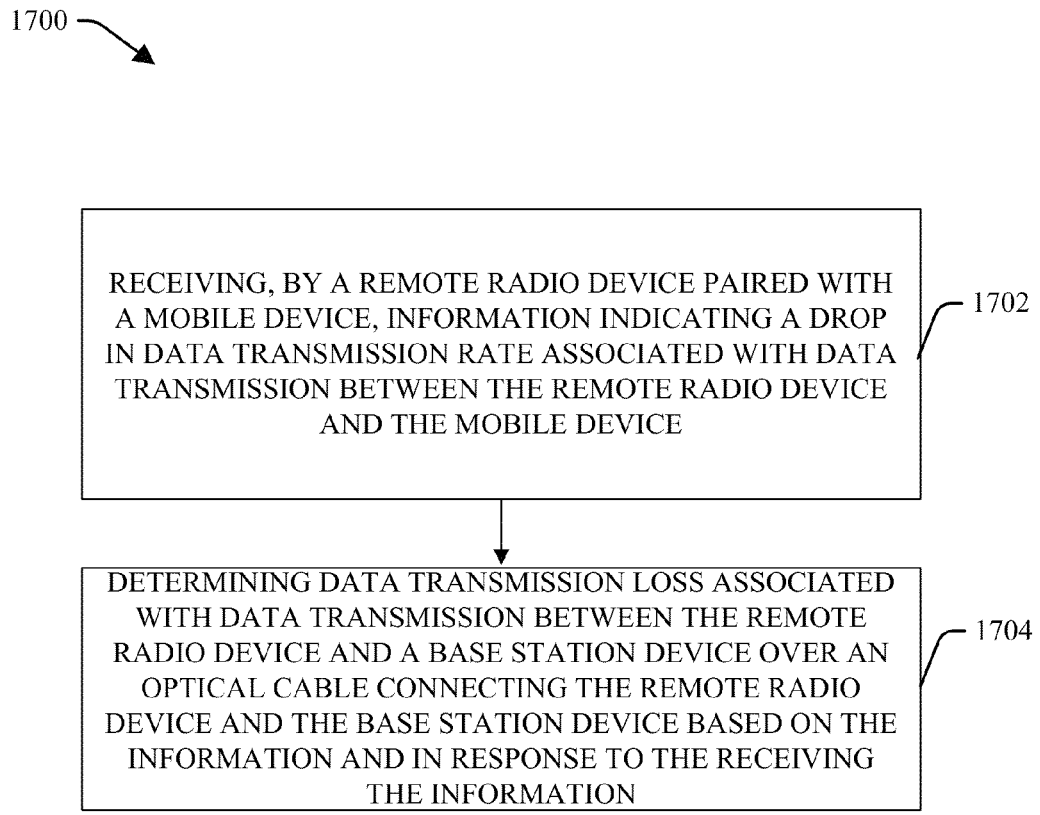
FIG. 17 illustrates a flow chart of an example method for calibrating performance data based in part on fiber loss by an RRH in accordance with the fourth embodiment and aspects described herein.

FIG. 17 illustrates a flow chart of an example method 1700 for calibrating performance data based in part on fiber loss by an RRH in accordance with the fourth embodiment and aspects described herein. At 1702, an RRH radio device served with a mobile device receives information indicating a drop in data transmission rate associated with data transmission between the RRH and the mobile device (e.g., using radio communication component 1004). At 1704, the RRH can determine data transmission loss associated with data transmission between the RRH and a base station device over an optical cable connecting the RRH and the base station device based on the information and in response to receiving the information (e.g., using calibration component 1008).

Figure 18:
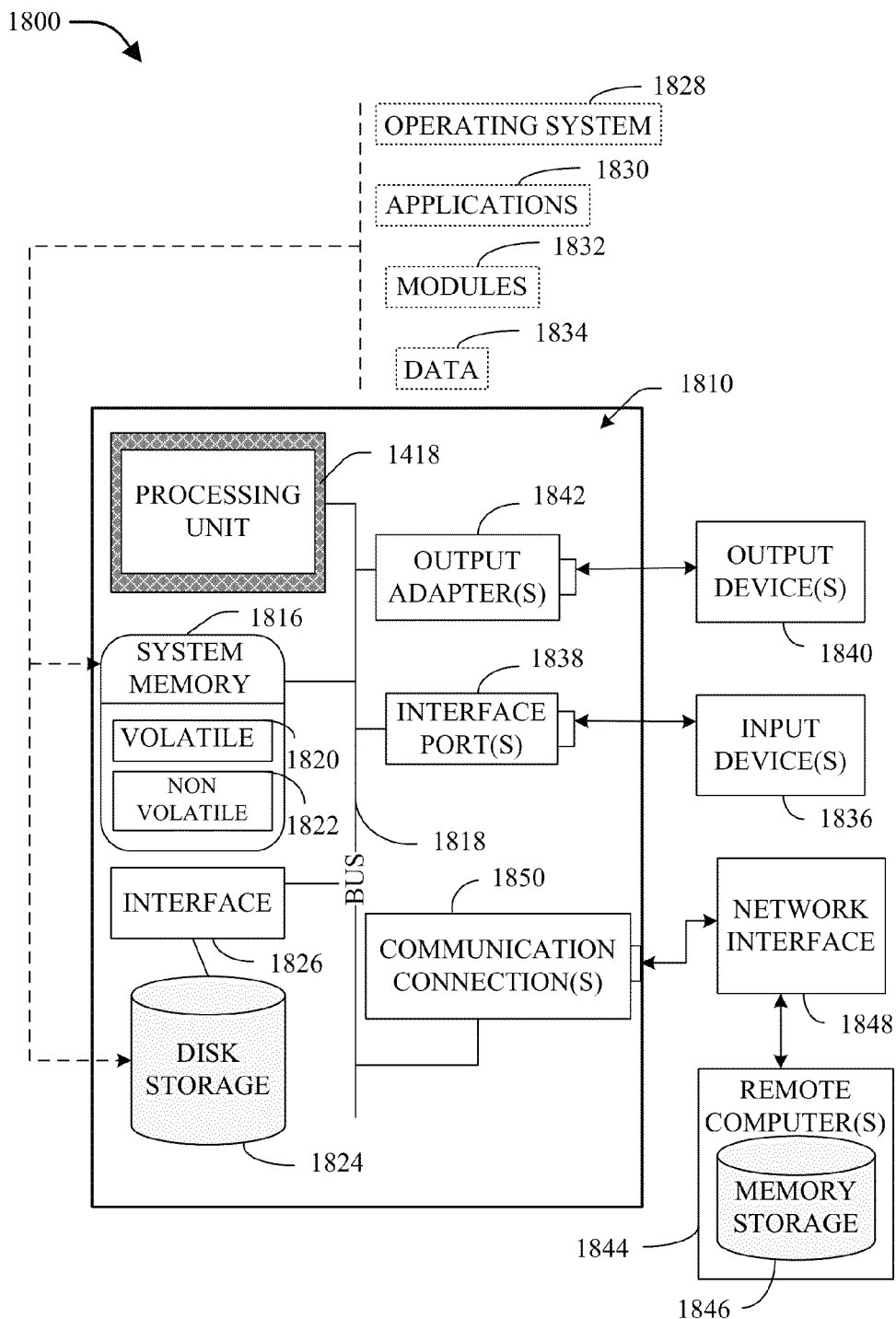
FIG. 18 is a schematic block diagram illustrating a suitable operating environment in accordance with various aspects and embodiments.
Figure 19:
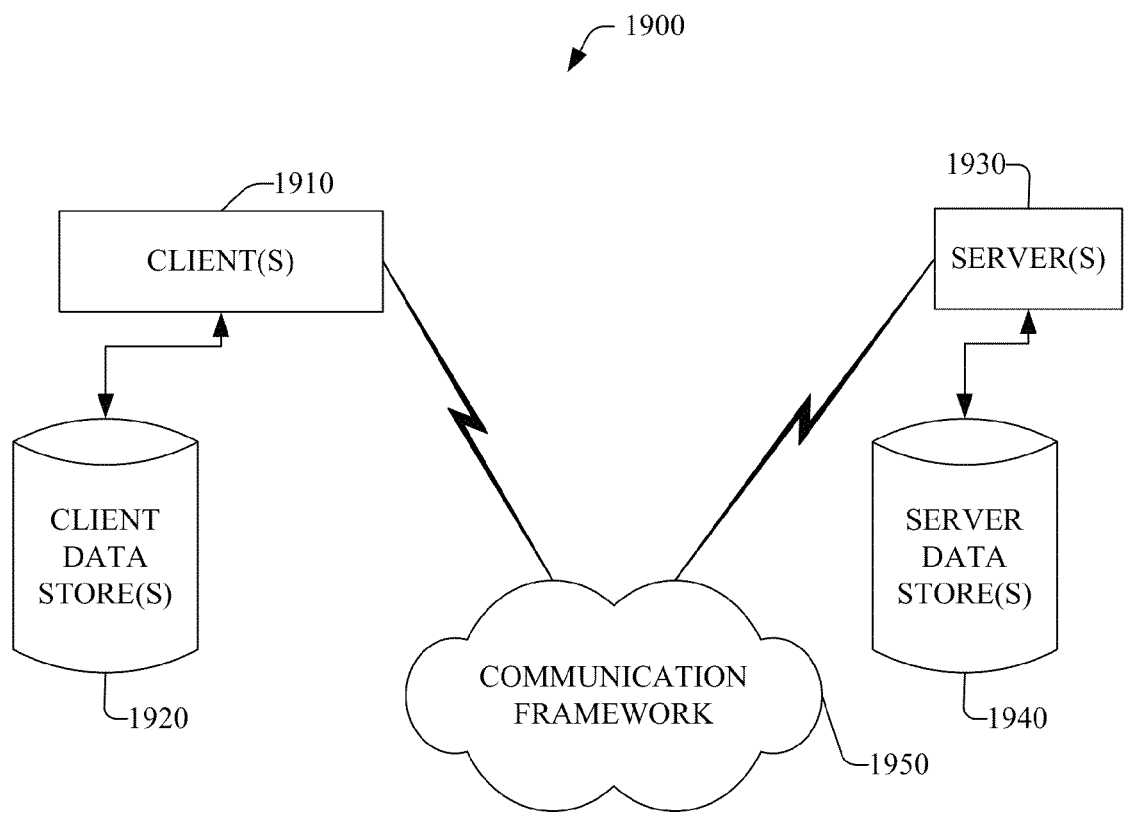
FIG. 19 is a schematic block diagram of a sample-computing environment in accordance with various aspects and embodiments.

Referring now FIGS. 18 and 19. FIGS. 18 and 19, as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., PDA, phone, electronic tablets or pads, etc.), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

With reference to FIG. 18, a suitable environment 1800 for implementing various aspects of this disclosure includes a computer 1812. The computer 1812 includes a processing unit 1814, a system memory 1816, and a system bus 1818. It is to be appreciated that the computer 1812 can be used in connection with implementing one or more of the systems or components shown and described in connection with FIGS. 1-7, or otherwise described herein. The system bus 1818 couples system components including, but not limited to, the system memory 1816 to the processing unit 1814. The processing unit 1814 can be any of various available processors. Dual microprocessors and other multiprocessor architectures also can be employed as the processing unit 1814.

The system bus 1818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1816 includes volatile memory 1820 and nonvolatile memory 1822. The basic input/output system (BIOS), containing the basic routines to transfer information between elements within the computer 1810, such as during start-up, is stored in nonvolatile memory 1822. By way of illustration, and not limitation, nonvolatile memory 1822 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1820 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1810 also includes removable/non-removable, volatile/non-volatile computer storage media. FIG. 18 illustrates, for example, a disk storage 1824. Disk storage 1824 includes, but is not limited to, devices like a magnetic disk drive, floppy disk drive, tape drive, Jaz drive, Zip drive, LS-100 drive, flash memory card, or memory stick. The disk storage 1824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1824 to the system bus 1818, a removable or non-removable interface is typically used, such as interface 1826.

FIG. 18 also depicts software that acts as an intermediary between users and the basic computer resources described in the suitable operating environment 1800. Such software includes, for example, an operating system 1828. Operating system 1828, which can be stored on disk storage 1824, acts to control and allocate resources of the computer system 1810. System applications 1830 take advantage of the management of resources by operating system 1828 through program modules 1832 and program data 1834 stored, e.g., in system memory 1816 or on disk storage 1824. It is to be appreciated that this disclosure can be implemented with various operating systems or combinations of operating systems.

A user enters commands or information into the computer 1810 through input device(s) 1836. Input devices 1836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1814 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port may be used to provide input to computer 1810, and to output information from computer 1810 to an output device 1840. Output adapter 1842 is provided to illustrate that there are some output devices 1840 like monitors, speakers, and printers, among other output devices 1840, which require special adapters. The output adapters 1842 include, by way of illustration and not limitation, video and sound cards that provide a means of connection between the output device 1840 and the system bus 1818. It should be noted that other devices and/or systems of devices provide both input and output capabilities such as remote computer(s) 1844.

Computer 1810 can operate in a networked environment using logical connections to one or more remote computers, such as remote computer(s) 1844. The remote computer(s) 1844 can be a personal computer, a server, a router, a network PC, a workstation, a microprocessor based appliance, a peer device or other common network node and the like, and typically includes many or all of the elements described relative to computer 1810. For purposes of brevity, only a memory storage device 1846 is illustrated with remote computer(s) 1844. Remote computer(s) 1844 is logically connected to computer 1810 through a network interface 1848 and then physically connected via communication connection 1850. Network interface 1848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1850 refers to the hardware/software employed to connect the network interface 1848 to the bus 1818. While communication connection 1850 is shown for illustrative clarity inside computer 1810, it can also be external to computer 1810. The hardware/software necessary for connection to the network interface 1848 includes, for exemplary purposes only, internal and external technologies such as, modems including regular telephone grade modems, cable modems and DSL modems, ISDN adapters, and Ethernet cards.

FIG. 19 is a schematic block diagram of a sample-computing environment 1900 (e.g., computing system) with which the subject matter of this disclosure can interact. The system 1900 includes one or more client(s) 1910. The client(s) 1910 can be hardware and/or software (e.g., threads, processes, computing devices). The system 1900 also includes one or more server(s) 1930. Thus, system 1900 can correspond to a two-tier client server model or a multi-tier model (e.g., client, middle tier server, data server), amongst other models. The server(s) 1930 can also be hardware and/or software (e.g., threads, processes, computing devices). The servers 1930 can house threads to perform transformations by employing this disclosure, for example. One possible communication between a client 1910 and a server 1930 may be in the form of a data packet transmitted between two or more computer processes.

The system 1900 includes a communication framework 1950 that can be employed to facilitate communications between the client(s) 1910 and the server(s) 1930. The client(s) 1910 are operatively connected to one or more client data store(s) 1920 that can be employed to store information local to the client(s) 1910. Similarly, the server(s) 1930 are operatively connected to one or more server data store(s) 1940 that can be employed to store information local to the servers 1930.

It is to be noted that aspects, features, and/or advantages of the disclosed subject matter can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as Internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions, wherein the processor can directly perform operations, and/or the processor can indirectly perform operations, for example, by directing or controlling one or more other components to perform operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In the subject specification, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "Node B," "Evolved Node B" (eNode B or base station), "Home Node B" (HNB) "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, UE, AP, communication network, application, transition management component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A remote radio device, comprising:
   a radio unit configured to wirelessly communicate with another device using radio frequency signals;
   a baseband unit configured to communicate with a base station device using a cable connecting the device to the base station device;
   a memory having computer executable components stored thereon; and
   a processor communicatively coupled to the memory, the processor configured to facilitate execution of the computer executable components, the computer executable components, comprising:
   a calibration component configured to determine data transmission loss associated with transmission of data over the cable, wherein the radio unit is configured to broadcast information representative of the data transmission loss.

2. The remote radio device of claim 1, wherein the calibration component is configured to determine the data transmission loss as a function of interference associated with a cellular network in which the remote radio device is employed.

3. The remote radio device of claim 1, wherein the calibration component is configured to determine the data transmission loss as a function of loading on the remote radio device.

4. The remote radio device of claim 3, wherein the calibration component is configured to increase a value associated with the data transmission loss based on an increase in the loading.

5. The remote radio device of claim 1, wherein radio unit is configured to broadcast the information representative of the data transmission loss in response to determination of the data transmission loss by the calibration component.

6. The remote radio device of claim 5, wherein the radio unit is configured to broadcast the information periodically.

7. The remote radio device of claim 1, the computer executable components further comprising a power component configured to modify transmission power associated with data transmission using the radio frequency unit or the baseband unit based on data transmission loss.

8. The remote device of claim 7, wherein the calibration component is configured to modify a value associated with the data transmission loss based on the transmission power and wherein the radio unit is configured to broadcast the value.

9. The remote radio device of claim 7, wherein the power component is configured to increase the transmission power in response to the data transmission loss associated being below a threshold value.

10. The remote radio device of claim 1, the computer executable components further comprising a collection component configured to collect other information representative of data transmission loss over cables respectively connecting neighboring remote radio device devices to one or more base station devices, wherein the base station device is included in the one or more base station devices, and wherein the and the radio unit is configured to broadcast the other information.

11. A method comprising:
employing at least one processor executing computer executable instructions embodied on at least one non-transitory computer readable medium to perform operations comprising:
determining, by a remote radio device, data transmission loss associated with transmission of data over a cable connecting the remote radio device to a base station device;
receiving, by the remote radio device, a request from a mobile device to access the remote radio device;
determining a power level of a radio frequency signal received by the remote radio device in association with the request;
determining a performance level based on the data transmission loss and the power level; and
enabling the mobile device to access the remote radio device in response to the performance level being above a threshold value.

12. The method of claim 11, further comprising denying access between the remote radio device and the mobile device in response to the performance level being determined to be below the threshold value.

13. The method of claim 11, further comprising:
receiving by the remote radio device, measurement data indicating strengths of signals received by the mobile device and other remote radio devices associated with a cellular network in which the remote radio device is employed;
calibrating the measurement data based on the data transmission loss to determine calibrated measurement data; and
determining a coordinated multipoint transmission scheme involving at least one of the other remote radio devices based on the calibrated measurement data.

14. The method of claim 13, further comprising:
collecting other information representative of data transmission loss over cables respectively connecting the other remote radio device devices to one or more base station devices of the cellular network, wherein the base station device is included in the one or more base station devices, and wherein the calibrating further comprises calibrating the measurement data based on the other information.

15. The method of claim 14, further comprising;
estimating data transmission loss associated with radio frequency signal transmission between the mobile device and the other remote radio devices respectively based in part on a location of the mobile device, wherein the calibrating further comprises calibrating the measurement data based on the data transmission loss associated with the radio frequency signal transmission between the mobile device and the other remote devices.

16. The method of claim 11, further comprising:
accessing with the remote radio device for a period of time;
prompting the remote device to transmit a reference signal after the period of time; and
receiving, in response to the prompting, other information representative of first data transmission loss over cables respectively connecting neighbouring remote radio device devices to one or more base station devices, wherein the base station device is included in the one or more base station devices, and second data transmission loss associated with radio frequency transmission between respective ones of the neighbouring remote radio device devices and the mobile device.

17. The method of claim 16, further comprising:
determining by the remote radio device after the period of time, updated data transmission loss associated with transmission of data over the cable connecting the remote radio device to the base station device; and
determining a coordinated multipoint transmission (CoMP) protocol or a handover operation associated with the remote radio device and the mobile device based on the other information and the updated data transmission loss.

18. A mobile device comprising;
a memory having computer executable components stored thereon; and
a processor communicatively coupled to the memory, the processor configured to facilitate execution of the computer executable components, the computer executable components, comprising:
a selection component configured to select a remote radio device from a plurality of remote radio devices of a cellular network to employ for data transmission;
a communication component configured to conduct the data transmission with the remote radio device using radio frequency transmissions; and
a performance evaluation component configured to determine a data transmission performance level based on the radio frequency transmissions, compare the data transmission performance level to a reference value, and infer a degree of data loss associated with data transmission between the remote radio device and a base station device over a cable employed by the remote radio device to complete the data transmission based on a difference between the data transmission performance level and the reference value.

19. The mobile device of claim 18, the computer executable components further comprising:
a calibration component configured to calibrate the data transmission performance level based on the degree of data loss associated with the data transmission between the remote radio device and the base station device over the cable to generate a calibrated data transmission performance level.

20. The mobile device of claim 19, the computer executable components further comprising:
a reporting component configured to report information representative of at least one of the data transmission performance level or the calibrated data transmission performance level to the remote radio device.

21. The mobile device of claim 20, wherein the selection component is configured to receive a request to end data communication with the remote radio device in response to transmission of the information to the remote radio device.

22. A non-transitory computer readable medium comprising computer executable instructions that, in response to execution, cause a system comprising a processor to perform operations, comprising:
receiving, by a remote radio device employed by a mobile device for data transmission, information indicating a drop in a rate of the data transmission;
determining first data transmission loss associated with data transmission between the remote radio device and a base station device over a cable connecting the remote radio device and the base station device based on the information and in response to the receiving the information; and determining second data transmission loss associated with data transmission between the remote radio device and the mobile device using radio frequency signals.

23. The non-transitory computer readable medium of claim 22, the operations further comprising associating information representative of the first and second data transmission loss with the mobile device in memory of the remote radio device.

24. The non-transitory computer readable medium of claim 22, the operations further comprising employing the information to determine a coordinated multipoint transmission (CoMP) scheme or a handover operation associated with the remote radio device and the mobile device.

* * * * *